US011691582B2

(12) United States Patent
Drever

(10) Patent No.: US 11,691,582 B2
(45) Date of Patent: Jul. 4, 2023

(54) QUICK RELEASE GRILL GUARD AND ASSOCIATED SYSTEMS AND METHODS

(71) Applicant: Holt Sales and Service, Inc., Des Moines, IA (US)

(72) Inventor: Jeremy Drever, Ankeny, IA (US)

(73) Assignee: Holt Sales and Service, LLC, Des Moines, IA (US)

( * ) Notice: Subject to any disclaimer, the term of this patent is extended or adjusted under 35 U.S.C. 154(b) by 0 days.

(21) Appl. No.: 17/576,099

(22) Filed: Jan. 14, 2022

(65) Prior Publication Data

US 2022/0153216 A1 May 19, 2022

Related U.S. Application Data

(63) Continuation of application No. 16/877,168, filed on May 18, 2020, now Pat. No. 11,230,241, which is a
(Continued)

(51) Int. Cl.
*B60R 19/52* (2006.01)
*E05C 3/12* (2006.01)
(Continued)

(52) U.S. Cl.
CPC ............... *B60R 19/52* (2013.01); *E05C 3/12* (2013.01); *E05C 3/14* (2013.01); *E05C 9/08* (2013.01);
(Continued)

(58) Field of Classification Search
CPC ..... B60R 19/52; B60R 2019/522; E05C 3/12; E05C 3/14; E05C 9/08; E05D 11/1007; Y10T 292/082; E05Y 2900/50
See application file for complete search history.

(56) References Cited

U.S. PATENT DOCUMENTS

| 1,562,694 A | 11/1925 | Farum |
| 2,215,002 A | 9/1940 | Jandus et al. |

(Continued)

FOREIGN PATENT DOCUMENTS

| AU | 47646 | 7/1990 |
| CA | 2618075 A1 | 7/2009 |

(Continued)

OTHER PUBLICATIONS

"Why Ex-Guard?", Published in: US.
(Continued)

*Primary Examiner* — Lori L Lyjak
(74) *Attorney, Agent, or Firm* — Dentons Davis Brown; Matthew Warner-Blankenship

(57) ABSTRACT

The disclosed apparatus, systems and methods relate to a quick release grill guard further comprising at least one latching system configured for the quick release and pivot of the grill guard away from the vehicle grill face. The quick release grill guard may comprises a vehicle coupling portion, a clasped member an elongate bar and a clasping member. The clasping member may be constructed and arranged to be releasably engaged with the clasped member. Further, actuation of the elongate bar may cause the clasping member and clasped member to disengage.

20 Claims, 39 Drawing Sheets

Related U.S. Application Data continuation-in-part of application No. 16/166,326, filed on Oct. 22, 2018, now Pat. No. 10,906,489, which is a continuation of application No. 15/419,377, filed on Jan. 30, 2017, now Pat. No. 10,106,114, which is a continuation of application No. 14/825,344, filed on Aug. 13, 2015, now Pat. No. 9,555,757, which is a continuation of application No. 14/249,974, filed on Apr. 10, 2014, now Pat. No. 9,114,771.

(60) Provisional application No. 62/849,240, filed on May 17, 2019, provisional application No. 61/810,598, filed on Apr. 10, 2013.

(51) Int. Cl.
*E05C 3/14* (2006.01)
*E05D 11/10* (2006.01)
*E05C 9/08* (2006.01)

(52) U.S. Cl.
CPC .... *E05D 11/1007* (2013.01); *B60R 2019/522* (2013.01); *E05Y 2900/50* (2013.01); *Y10T 292/082* (2015.04)

(56) References Cited

U.S. PATENT DOCUMENTS

| | | |
|---|---|---|
| 2,273,131 A | 2/1942 | Monchmeier |
| 2,468,809 A | 5/1949 | Brock et al. |
| 2,672,363 A | 3/1954 | Buchanan |
| 3,005,511 A | 10/1961 | Riedy |
| 3,376,946 A | 4/1968 | Paulson |
| 3,749,436 A | 7/1973 | Hitchcock |
| 3,935,920 A | 2/1976 | Schiel |
| 4,541,645 A | 9/1985 | Foeldesi |
| 5,370,285 A | 12/1994 | Steelman |
| 5,636,885 A | 6/1997 | Hummel |
| 5,692,659 A | 12/1997 | Reeves |
| 6,447,032 B1 | 9/2002 | Howell et al. |
| 6,547,289 B1 | 4/2003 | Greenheck et al. |
| 6,682,111 B1 * | 1/2004 | Houseman ............ B60R 19/46 293/145 |
| 6,685,245 B1 | 2/2004 | Houseman et al. |
| 7,255,189 B2 | 8/2007 | Kurtz et al. |
| 7,325,848 B2 | 2/2008 | Joseph et al. |
| 7,410,082 B2 | 8/2008 | Stewart |
| 7,422,250 B2 | 9/2008 | Rose |
| 7,784,656 B2 | 8/2010 | Morrill et al. |
| 8,573,658 B2 | 11/2013 | Kim |
| 8,696,005 B2 | 4/2014 | Kim |
| 8,857,689 B2 | 10/2014 | Levi |
| 2006/0292915 A1 | 12/2006 | Bogoslofski et al. |
| 2009/0212581 A1 * | 8/2009 | Drever ............... B60R 19/52 293/115 |
| 2010/0283272 A1 | 11/2010 | Schneider |
| 2012/0049543 A1 | 3/2012 | Park |
| 2013/0187395 A1 * | 7/2013 | Hanson ............... B60R 19/52 293/115 |

FOREIGN PATENT DOCUMENTS

| | | | |
|---|---|---|---|
| CA | 2639140 A1 | 7/2009 | |
| CN | 202038260 U | 11/2011 | |
| EP | 1060955 A1 | 12/2000 | |
| GB | 735445 | 8/1955 | |
| GB | 2314060 A * | 12/1997 | ............ B60R 19/52 |
| GB | 2314060 A | 12/1997 | |
| JP | 7108888 B2 | 11/1995 | |
| KR | 19990060177 A | 7/1999 | |
| WO | 2010026834 A1 | 3/2010 | |

OTHER PUBLICATIONS

"Solutions for the Long Haul", Ex-Guard, Apr. 2010, Publisher: Excel Industries, Published in: Des Moines, IA.
Kuat Racks, "NV Install and Use", Jan. 20, 2012, Publisher: YouTube.
Lawrence et al., "A study of front-mounted bicycle racks on buses", 2004, Publisher: TRL Limited.
"Apex 3", Publisher: Sportsworks.
TractorByNet, "Grill Guard", Publisher: TractorByNet.
"Schematics of guard on sale in 2010".

* cited by examiner

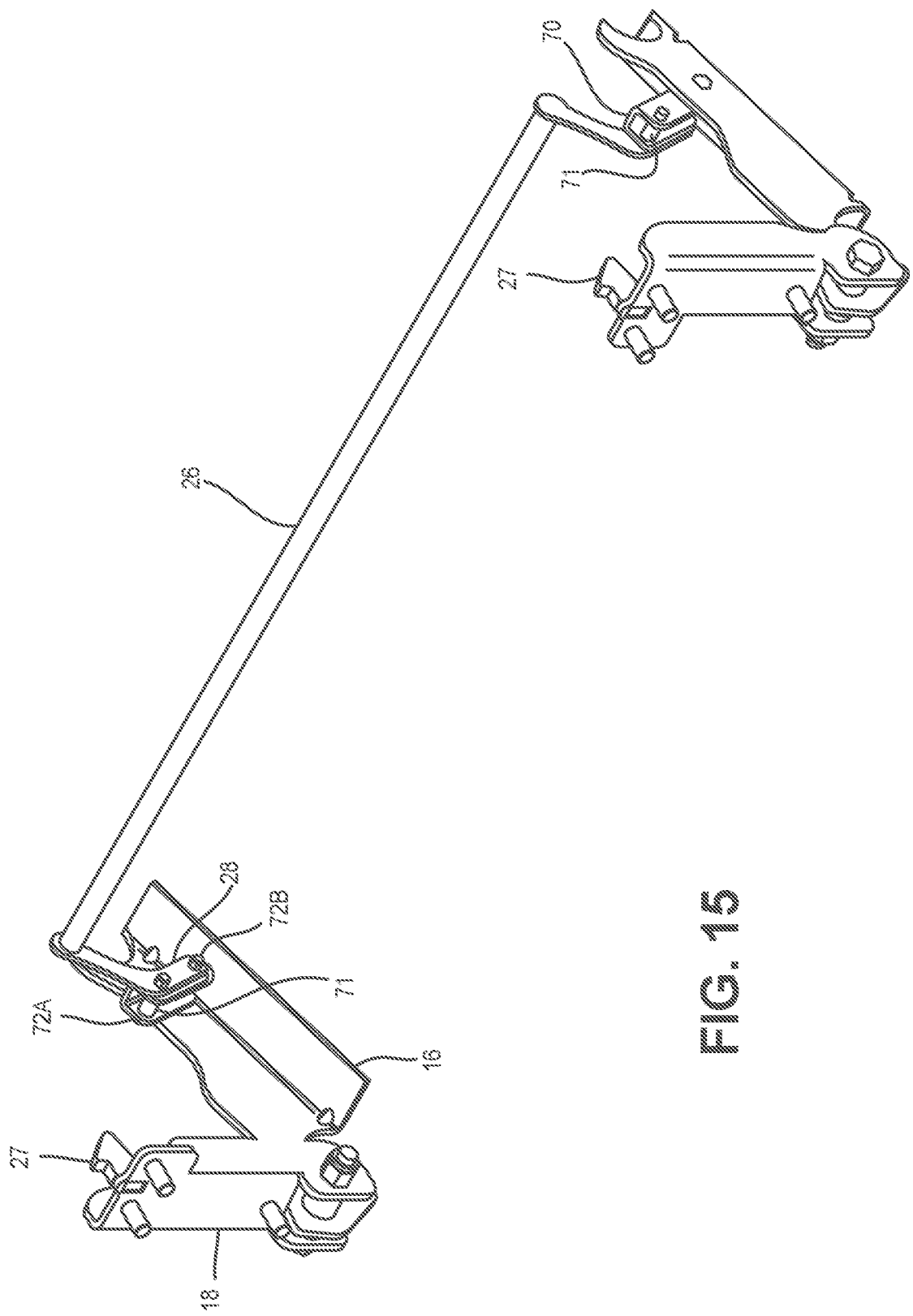

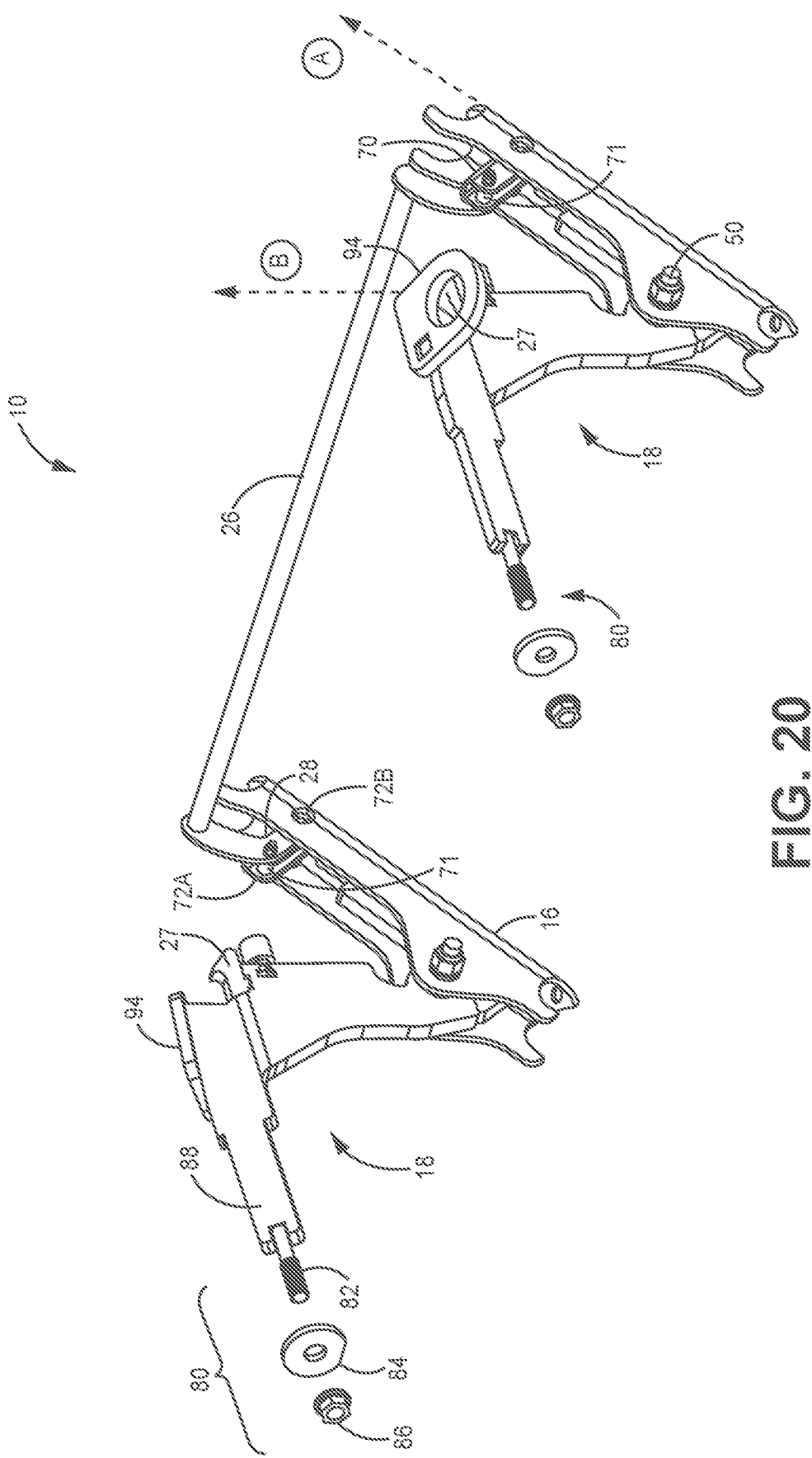

QUICK RELEASE GRILL GUARD AND ASSOCIATED SYSTEMS AND METHODS

CROSS-REFERENCE TO RELATED APPLICATION(S)

This application is a continuation of U.S. patent application Ser. No. 16/877,168, filed May 18, 2020, which is a continuation in part of, and claims priority to U.S. patent application Ser. No. 16/166,326, filed Oct. 22, 2018, which was a continuation of U.S. patent application Ser. No. 15/419,377 filed Jan. 30, 2017, which issued on Oct. 23, 2018 as U.S. Pat. No. 10,106,114, which was a continuation of U.S. patent application Ser. No. 14/825,344 filed Aug. 13, 2015 which issued on Jan. 31, 2017 as U.S. Pat. No. 9,555,757, which was a continuation of U.S. patent application Ser. No. 14/249,974 filed Apr. 10, 2014, which issued on Aug. 25, 2015 as U.S. Pat. No. 9,114,771, which claimed priority to U.S. Provisional Application 61/810,598 filed Apr. 10, 2013; this application also claims priority to U.S. Provisional Patent Application 62/849,240 filed May 17, 2019, all of the preceeding are hereby incorporated herein by reference in their entirety under 35 U.S.C. § 119(e).

TECHNICAL FIELD

The disclosure relates to devices, systems and methods for protecting the grills of semis, tractor trailers, trucks and other vehicles. More specifically, to devices and methods of using is an adjustable grill guard which is capable of quick release so as to be easily rotated away from the protected grill.

BACKGROUND

Trucks, such as semi-trucks and tractor trailers are ubiquitous on the roads at all hours of day and night, and are integral to the world's over-the-road transportation and hauling of goods. These trucks (which include, but are not limited to semis and tractor trailers) are quite expensive, and require significant investment.

Such trucks typically are fitted with a grill at the front to allow for air intake and engine cooling. In many implementations, these grills have aesthetic properties as well as functional ones. However, with the number of deer and other hazards that are present on the roads, collisions that damage these grills can lead to significant repair costs. Considering the continual increase in the price of fuel and other aspects of modern globalization, it is crucial for companies employing such methods of transport to keep their overall costs low. As such, there is a need in the art for a relatively inexpensive and effective way to protect these grills.

BRIEF SUMMARY

In Example 1, a grill guard comprising a grill coupling portion, a hinge, a latching system comprising a clasped member and a clasping member, and a vehicle coupling portion, wherein the clasping member is constructed and arranged to be releasably engaged with the clasped member to allow for free rotation of the grill coupling portion from the vehicle coupling portion.

In Example 2, the grill guard of claim 1, wherein the vehicle coupling portion is constructed and arranged to fit within an aperture of a vehicle and couple to vehicle tow points.

In Example 3, the grill guard of claim 2, wherein the vehicle coupling portion comprises an elongate member.

In Example 4, the grill guard of claim 1, wherein the vehicle coupling portion comprises a substantially planar member, the substantially planar member comprising a plurality of fasteners.

In Example 5, the grill guard of claim 1, further comprising a latching pin seated within the clasping member.

In Example 6, the grill guard of claim 5, wherein the clasped member is constructed and arranged to be in a locking position with the latching pin via a spring.

In Example 7, the grill guard of claim 6, further comprising a stop.

In Example 8, a grill guard latching system comprising a clasping member comprising a latching pin, a hinge, a quick release bar operatively engaged with the clasping member and rotatably engaged with the hinge, a clasped member constructed and arranged to be releasably engaged with the clasping member, wherein actuation of the quick release bar causes the quick release bar to pivot about the hinge and the clasping member to disengage from the clasped member.

In Example 9, the grill guard latching system of claim 8, further comprising a vehicle coupling portion, wherein the clasped member is disposed on the vehicle coupling portion.

In Example 10, the grill guard latching system of claim 8, further comprising a grill guard coupling portion wherein the grill guard coupling portion and the vehicle coupling portion are rotatably engaged.

In Example 11, the grill guard latching system of claim 10, further comprising a stop disposed on the grill guard coupling portion and constructed and arranged to abut the vehicle coupling portion when the clasping member and the clasped member are engaged.

In Example 12, the grill guard latching system of claim 11, further comprising a grill guard connected to the grill guard coupling portion.

In Example 13, the grill guard latching system of claim 8, further comprising a spring operatively engaged with hinge wherein the spring is capable of holding the clasping member and clasped member in a locked position.

In Example 14, a releasable grill guard comprising a grill guard assembly comprising a grill guard, and at least one latching system, comprising a hinge, an elongate release bar, a vehicle coupling portion comprising a fastening system, a grill guard coupling portion, and a latch, wherein actuation of the elongate release bar causes the grill guard assembly to rotate between a locked position and an open position.

In Example 15, the releasable grill guard of claim 14, wherein vehicle coupling portion comprises a catch, a bracket, and at least one fastener.

In Example 16, the releasable grill guard of claim 14, wherein the latch comprises a hinge and a latching mechanism, the latching mechanism further comprising a release axle.

In Example 17, the releasable grill guard of claim 16, wherein the latching mechanism further comprises a spring.

In Example 18, the releasable grill guard of claim 14, further comprising two latching systems.

In Example 19, the releasable grill guard of claim 14, wherein the grill guard is a double-looped guard.

In Example 20, the releasable grill guard of claim 14, wherein the grill guard is a single-looped guard.

While multiple embodiments are disclosed, still other embodiments of the grill guard will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 15 is a perspective view of the quick release grill guard comprising a latching system further comprising a quick release bar, according to one implementation.

FIG. 20 is a perspective view of the quick release grill guard comprising a latching system further comprising a quick release bar, according to one implementation.

DETAILED DESCRIPTION

Exemplary embodiments of the disclosed apparatus, systems and methods are herein described with references to the accompanying illustrations. It is to be understood that other embodiments may be utilized and structural and functional changes may be made without departing from the respective scope of the invention. As such, the instant description is presented by way of illustration only and should not limit in any way the various alternatives and modifications that may be made to the illustrated embodiments and still be within the spirit and scope of the invention.

As discussed herein, it is a principle object of the disclosed apparatus, systems and methods (collectively, the "grill guard") to provide a protective covering for the grill of a semi, tractor trailer, truck or other automobile ("vehicle") which is easy to pivot away from the vehicle. While references are made to the grill guard and vehicle throughout, this designation is made for brevity and in no way to reduce the scope of the various embodiments of the instant disclosure.

Exemplary embodiments of the quick release grill guard comprise a grill guard assembly and a bracket. The grill guard assembly further comprises a latching system which is configured to allow the easy adjustment of the grill guard in "open" and "closed" positions about a hinge.

In various implementations, the grill guard is curved to closely surround the front of the vehicle and prevent it from damage. In various implementations, the grill guard has a metal frame such as steel and a coating such as a PVC coating to prevent natural wear and corrosion on the metal frame. In various implementations, the metal frame is high-tensile steel, such as 8 gauge high-tensile steel.

Figure 1:
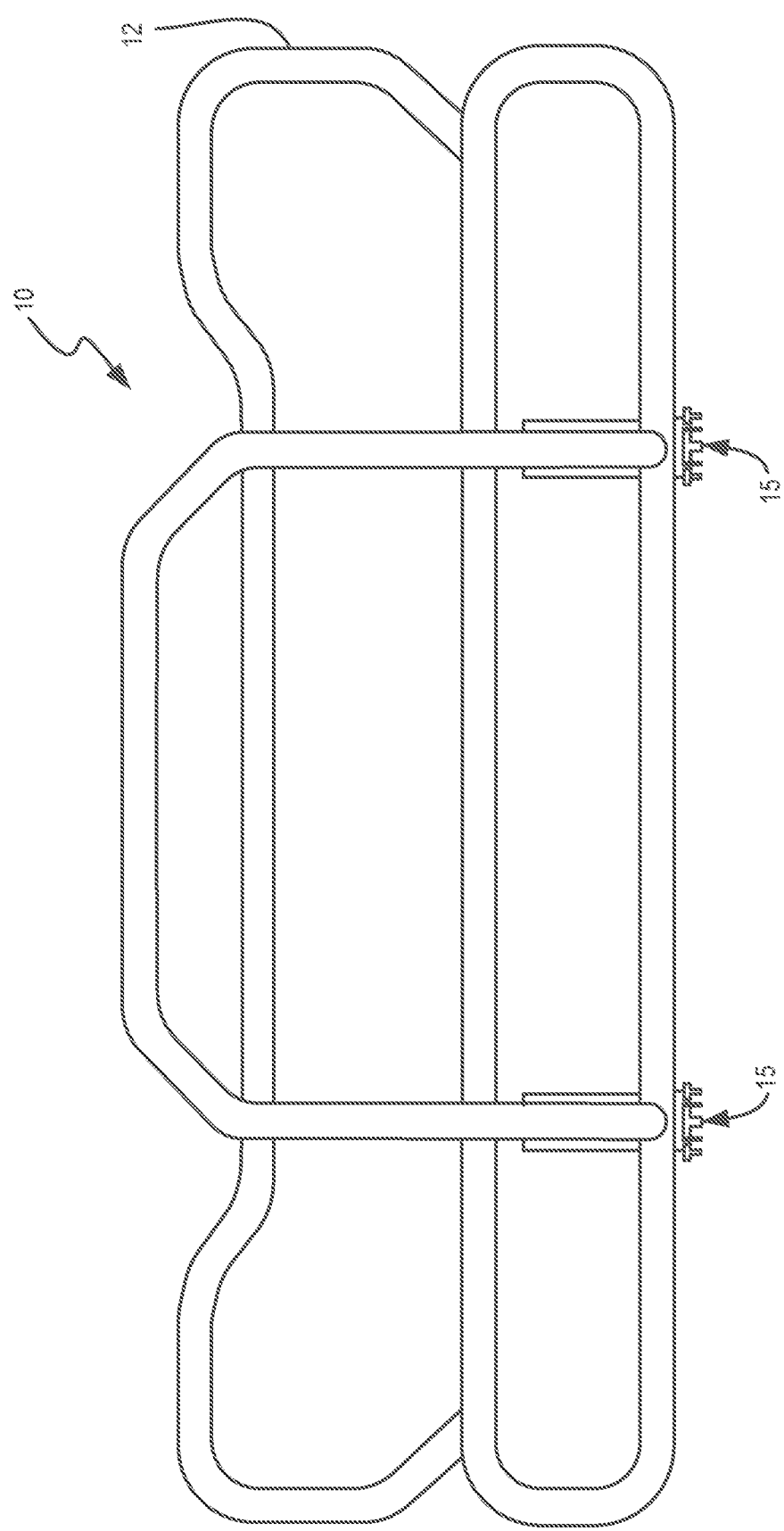
FIG. 1 is a front view of an exemplary embodiment of the quick release grill guard.

Turning to the figures in greater detail, various exemplary embodiments of a quick release grill guard 10 are depicted in FIGS. 1-19. As is shown in FIG. 1, exemplary embodiments of the quick release grill guard 10 adapted to be coupled to the front end of a motor vehicle. Exemplary embodiments of the quick release grill guard 10 comprise a grill guard assembly 12 and at least one latching system 15. As is depicted in FIGS. 1-5, the latching system 15 can encompass a variety of sizes and shapes of grill guard assemblies 12, including both double-looped (shown at 12A in FIG. 2) and single-looped (shown at 12B in FIG. 3) guard configurations, which are among several grill guard configurations which are well-established in the art.

Figure 2:
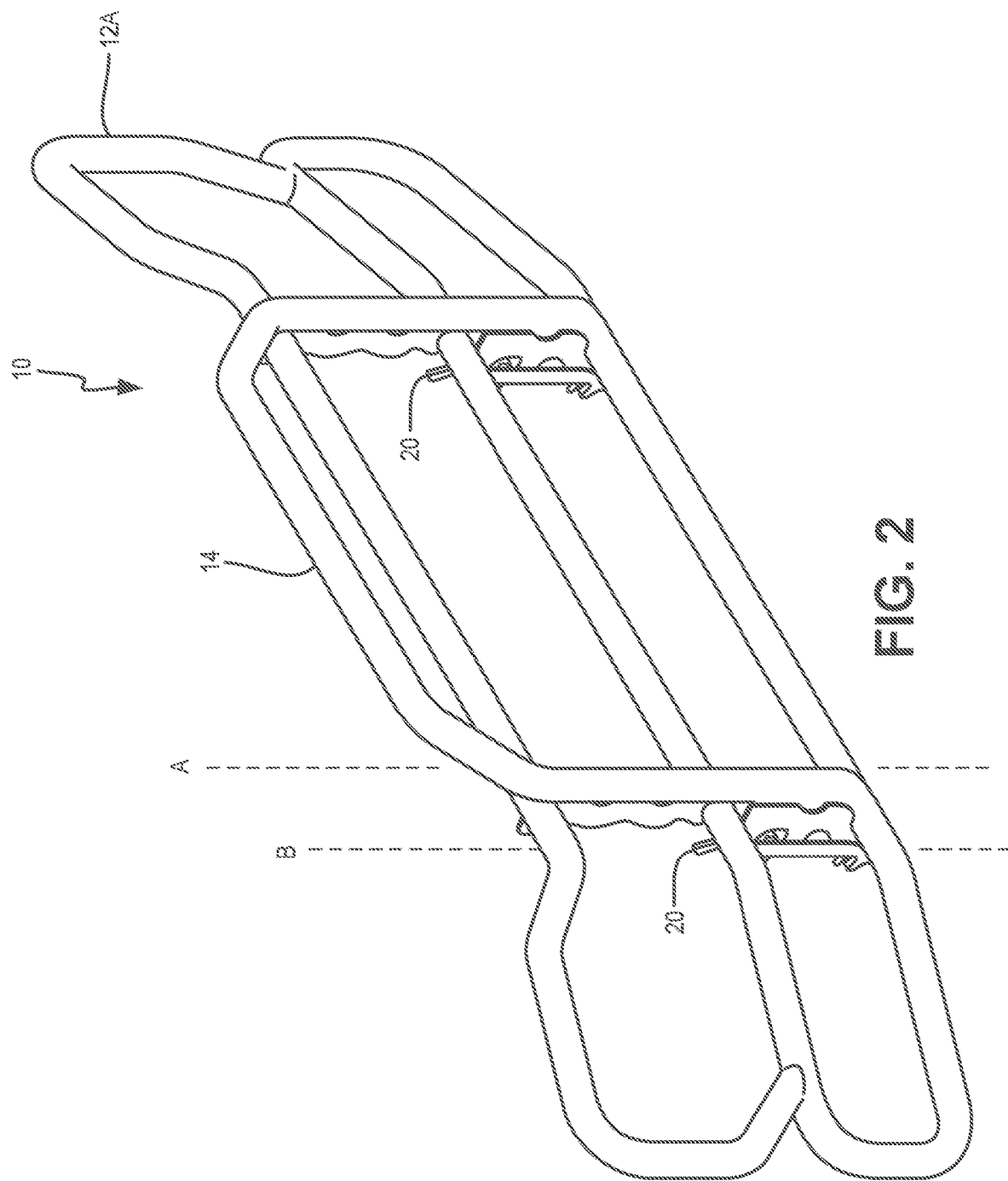
FIG. 2 is a perspective view of the quick release grill guard, according to an exemplary embodiment having a double-looped grill.
Figure 3:
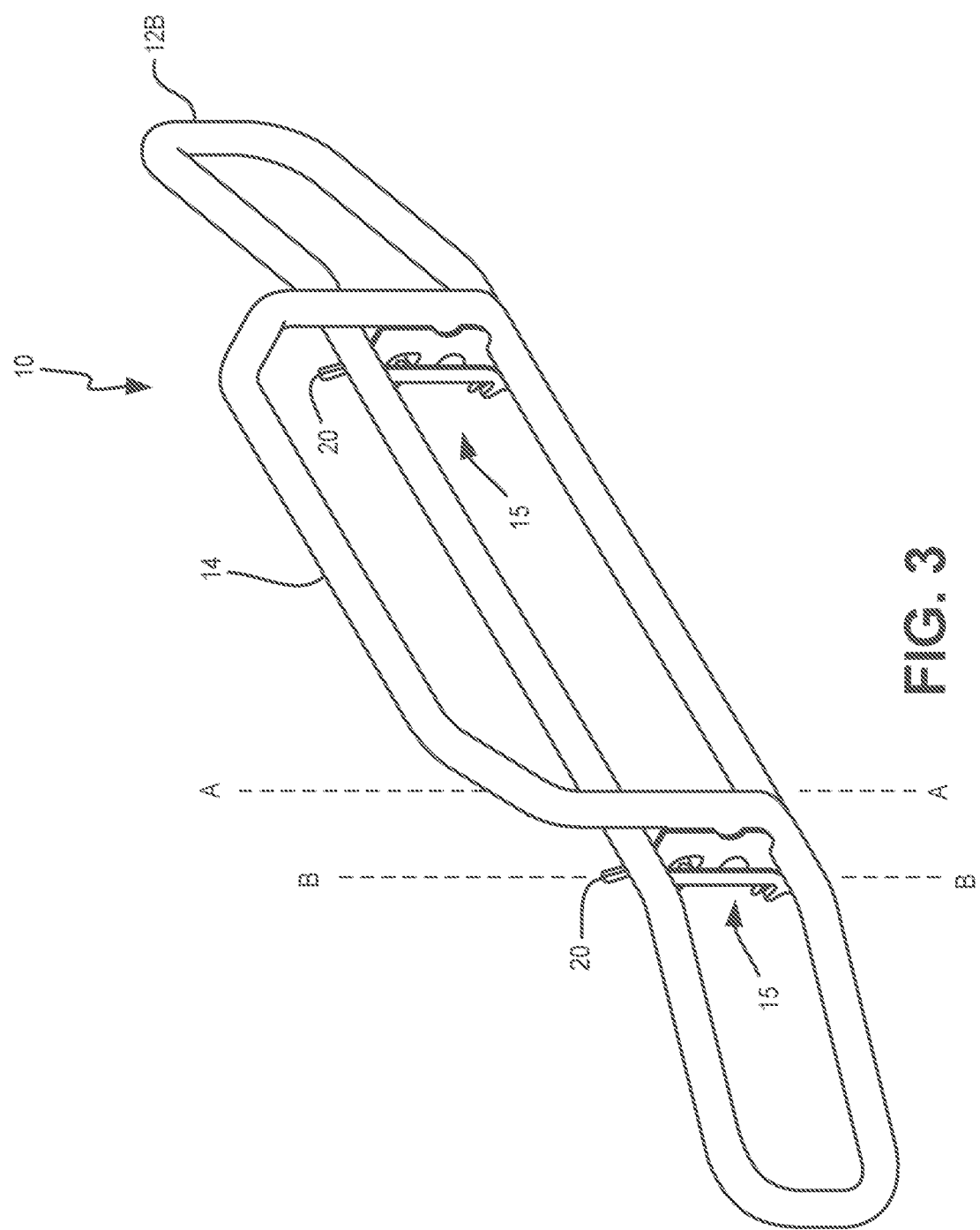
FIG. 3 is a perspective view of the quick release grill guard, according to an exemplary embodiment having a single-looped grill.
Figure 4:
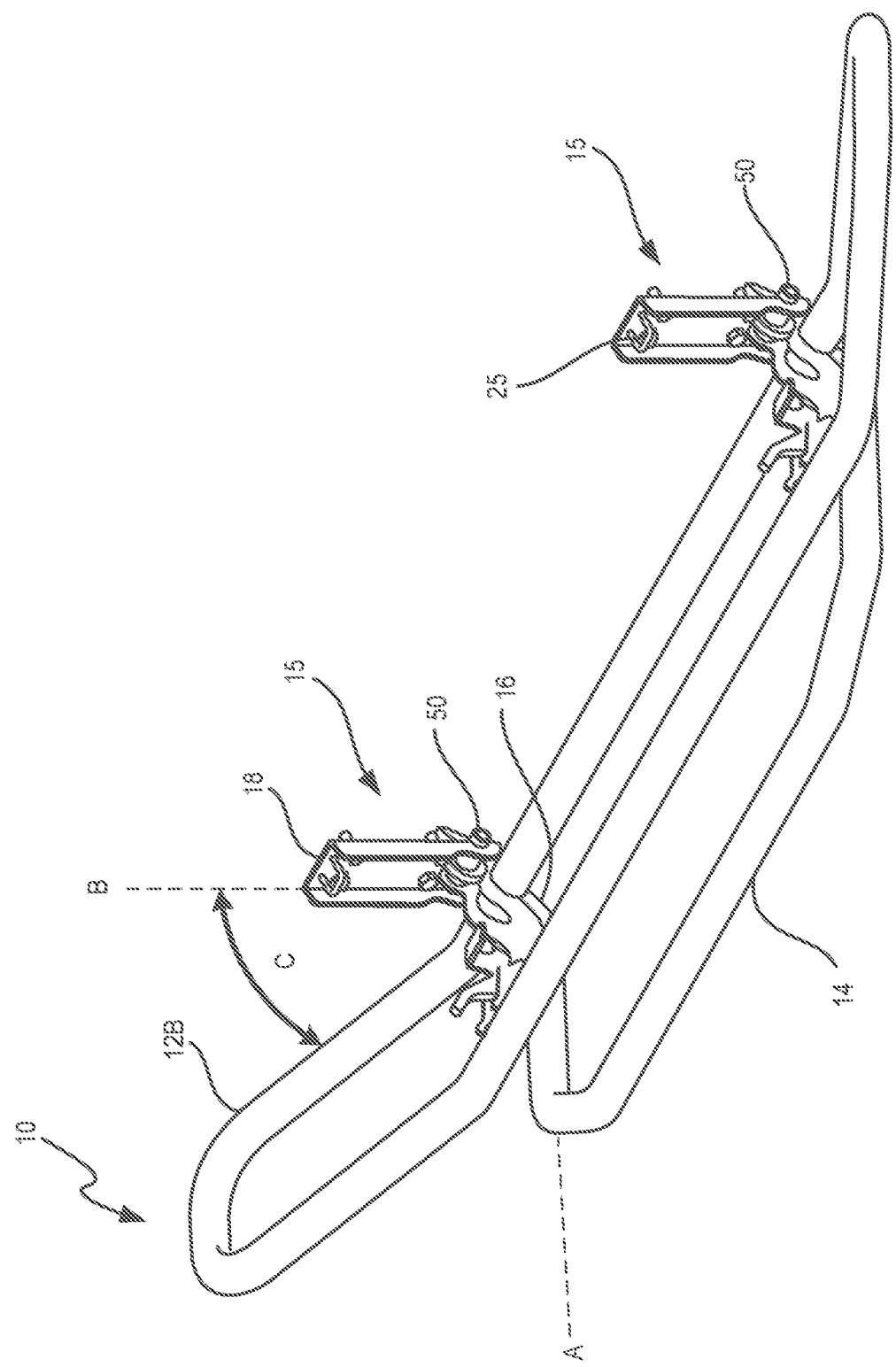
FIG. 4 is a perspective view of the quick release grill guard, according to the embodiment of FIG. 3 in the open position.

As is depicted in FIGS. 2-5, the quick release grill guard 10 is configured so as to facilitate rotation of the grill guard assembly 12 between positions. That is, in exemplary embodiments of the system 10, under normal operating conditions the grill guard assembly 12 is normally in a first position (as is shown in FIGS. 2-3), wherein the axis of the grill guard (designated by the line at A) is substantially parallel or otherwise aligned with the grill (designated by the line at B) of a vehicle such as a semi (not shown). However, the system 10 is configured such that when it is desired, the latching systems 15 may be operated so as to reposition the axis of the grill guard A away from the axis of the grill B. As is further depicted in FIGS. 4-5, a latching system 15 can further comprise a hinge 50 which facilitates the controlled rotation of the grill guard assembly 12 away from the grill face B (the grill guard coupling portion 16 relative to the vehicle coupling portion 18). In various implementations, this means that the uppermost portion 14 of the grill guard assembly can be rotated relative to the hinge 50 (as is described further in relation to FIGS. 6-7).

In various implementations, the uppermost portion 14—and therefore the axis of the grill guard assembly A—is moved/rotated into a second position wherein the axis is set at a substantially non-parallel angle to the grill face B. In certain embodiments, this may be an acute, perpendicular, or obtuse angle. An exemplary embodiment showing an acute angled second position is depicted by the reference arrows C and D in FIGS. 4-5, respectively.

The quick release grill guard 10 comprises at least one latching system 15, certain exemplary embodiments of which are shown in FIGS. 6-7 and 10-11. In various embodiments, the latching system 15 can further comprise a grill guard coupling portion 16 further comprising a release member 20 and grill coupling region 55, and a vehicle coupling portion 18 further comprising a catch 25, a bracket 30 and at least one fastener 40 for attaching the bracket 30 to the frame, bumper, or other fixed portion of the vehicle (not shown). In certain embodiments, the grill is coupled to the grill coupling region 55 by welding or some other means well-established in the art.

Figure 6:
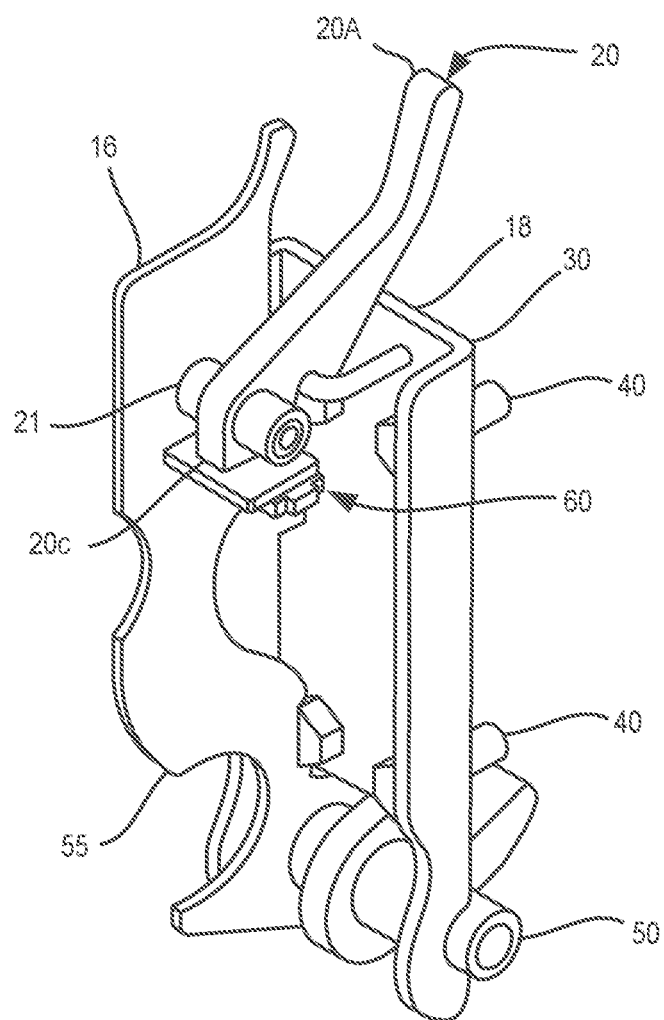
FIG. 6 is a perspective view of the latching system, according to one exemplary embodiment.

As is shown in FIG. 6, in certain exemplary embodiments the release member 20 is elongate, having first 20A and second 20C ends. In certain embodiments, the first end 20A is configured to provide a lever function for operation by the hand of a user and the second end 20C is configured to interact with the latching mechanism 60. In further embodiments, the release member 20 further comprises a release axle 21, about which the ends 20A, 20C of the release member can rotate. Various alternate configurations are possible.

Figure 5:
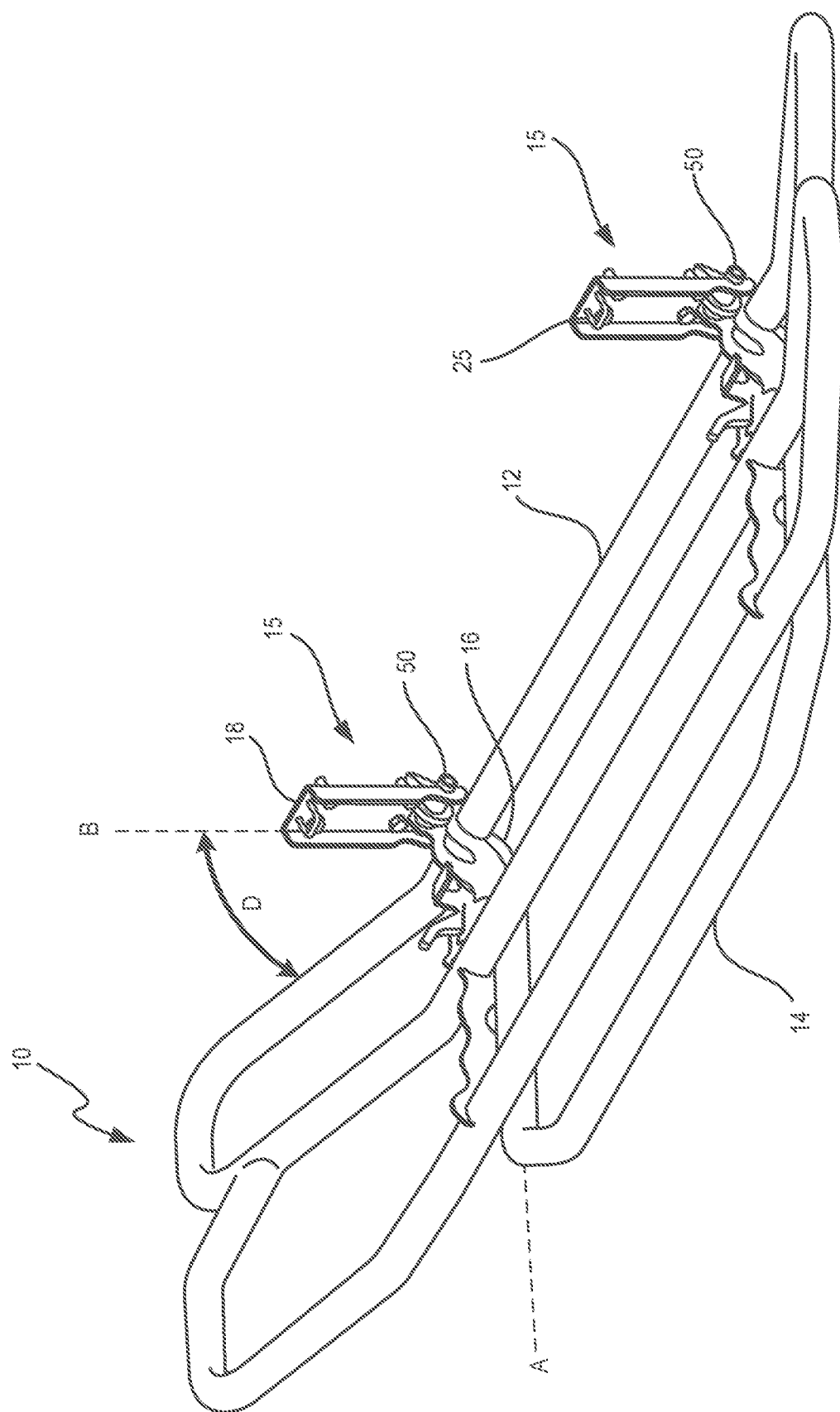
FIG. 5 is a perspective view of the quick release grill guard, according to the embodiment of FIG. 2 in the open position.
Figure 7:
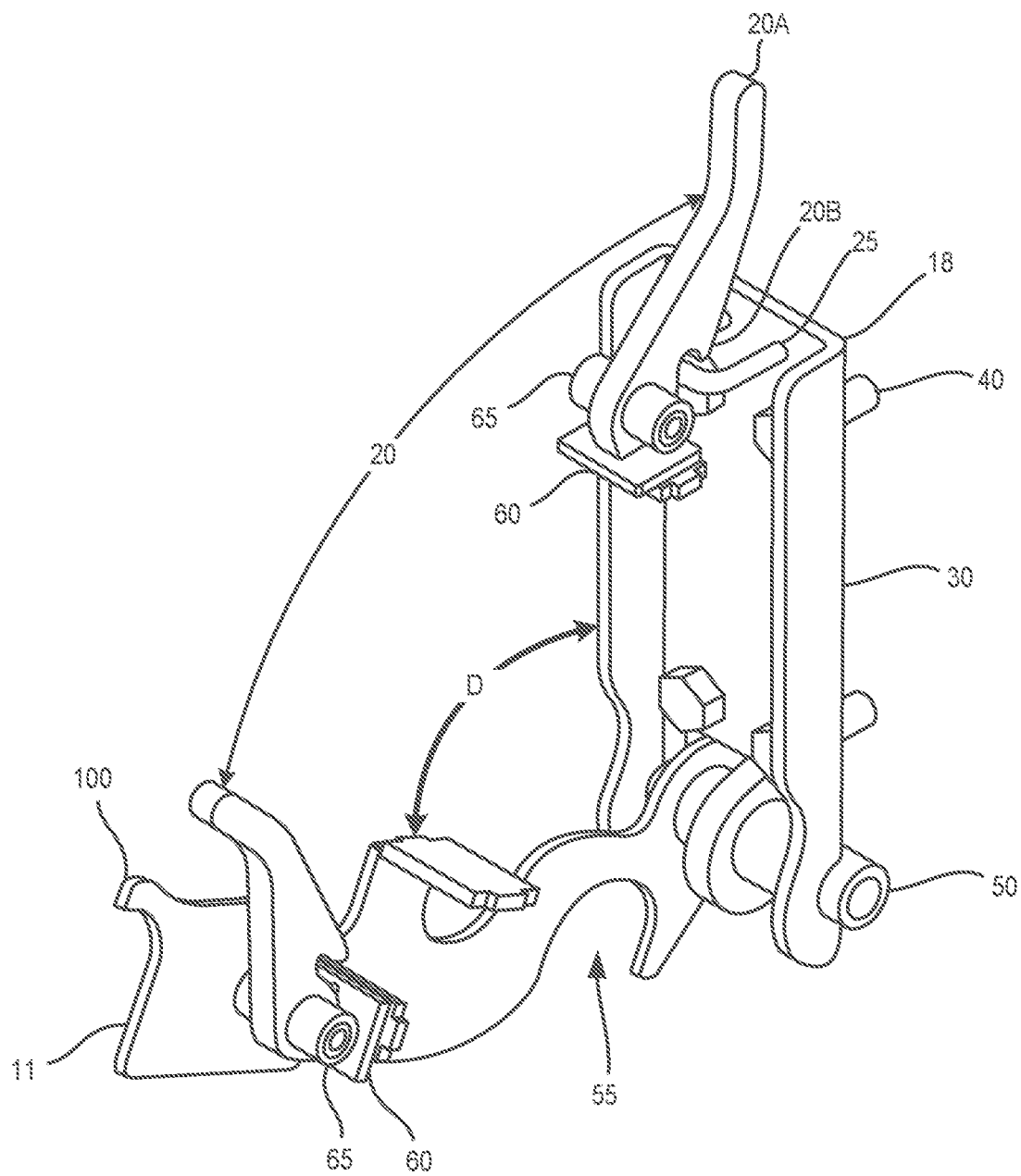
FIG. 7 is a perspective view of the latching system, according to the embodiment of FIG. 6 in the open position.
Figure 10:
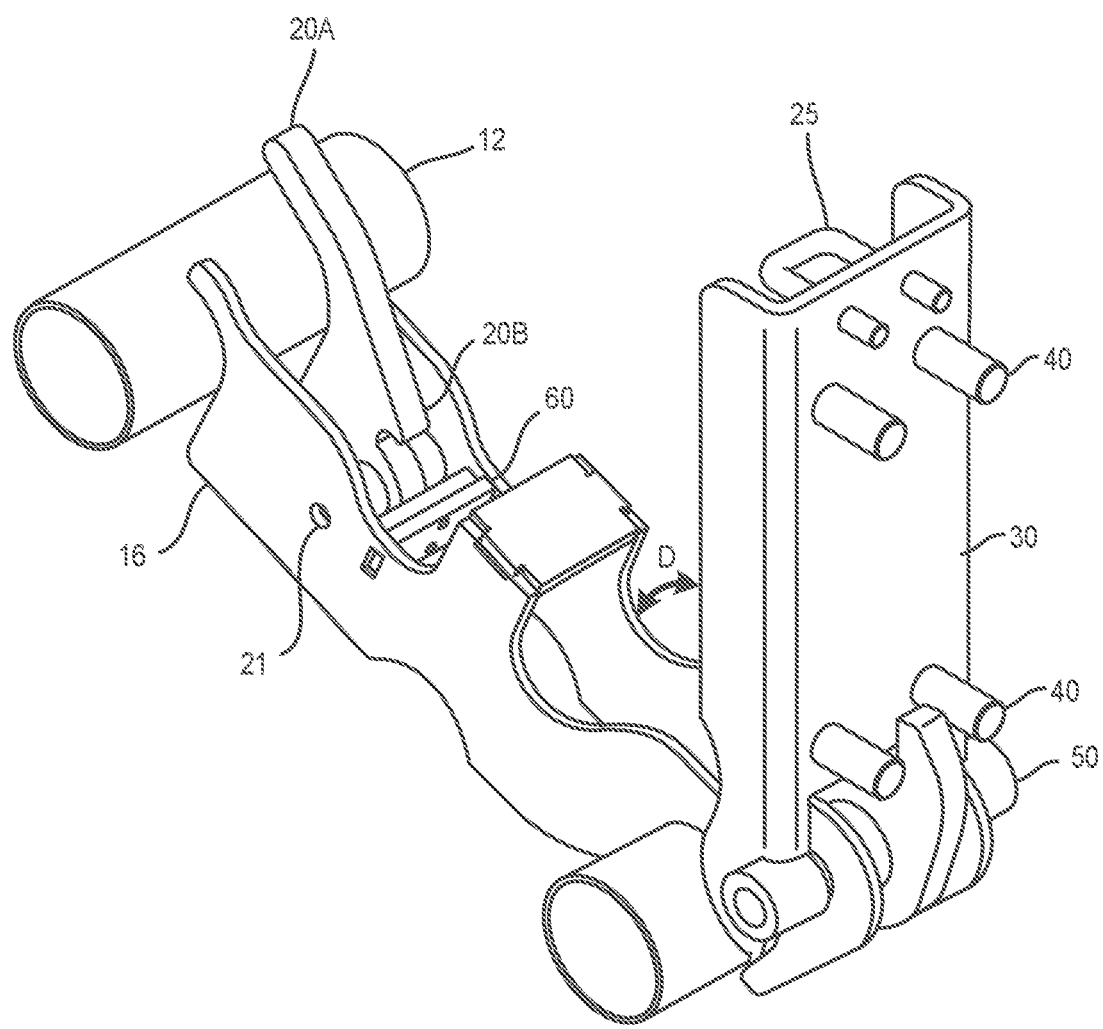
FIG. 10 is a reverse perspective view of the latching system in an open position, according to one exemplary embodiment.

FIG. 7 depicts the movement of the grill guard coupling portion 16 relative to the vehicle coupling portion 18. In certain of these implementations, the release member 20 is operably coupled to the catch 25 so as to be mechanically released by movement of the operable portion, or first end 20A relative to the release axle 21. In certain implementations, the latch further comprises a hinge 50, so as to allow relative movement of the grill guard coupling portion 16 away from vehicle coupling portion 18 along the axis of the hinge 50, so as to move the grill guard (not shown) away from the plane of the grill, as shown by reference arrow D and substantially coaxial with the hinge 50 on a pivot, as is shown in FIGS. 5, 7 and 10.

Returning to the release member 20 and catch 25, in certain embodiments, the latch 20 further comprises a latching mechanism 60, which further comprises a release axle 21. In various embodiments, the release axle 21 establishes an axis for the release member 20 to move around relative to the catch 25, so as to disengage the coupling region of the release member 20B from the catch. In certain embodiments, the latching mechanism 60 further comprises a spring, such as a polyurethane spring, which is configured to apply pressure to the release member so as to urge it into an "upright" or otherwise "locked" position over the catch 25, thus being configured to keep the guard 10 in a locked position under normal operating conditions. In circumstances in which the user wishes to disengage the latch 60 from the catch 25, the user may move the release member 20 manually by way of the lever region, or first end 20A, as would be apparent to one of skill in the art.

Figure 8:
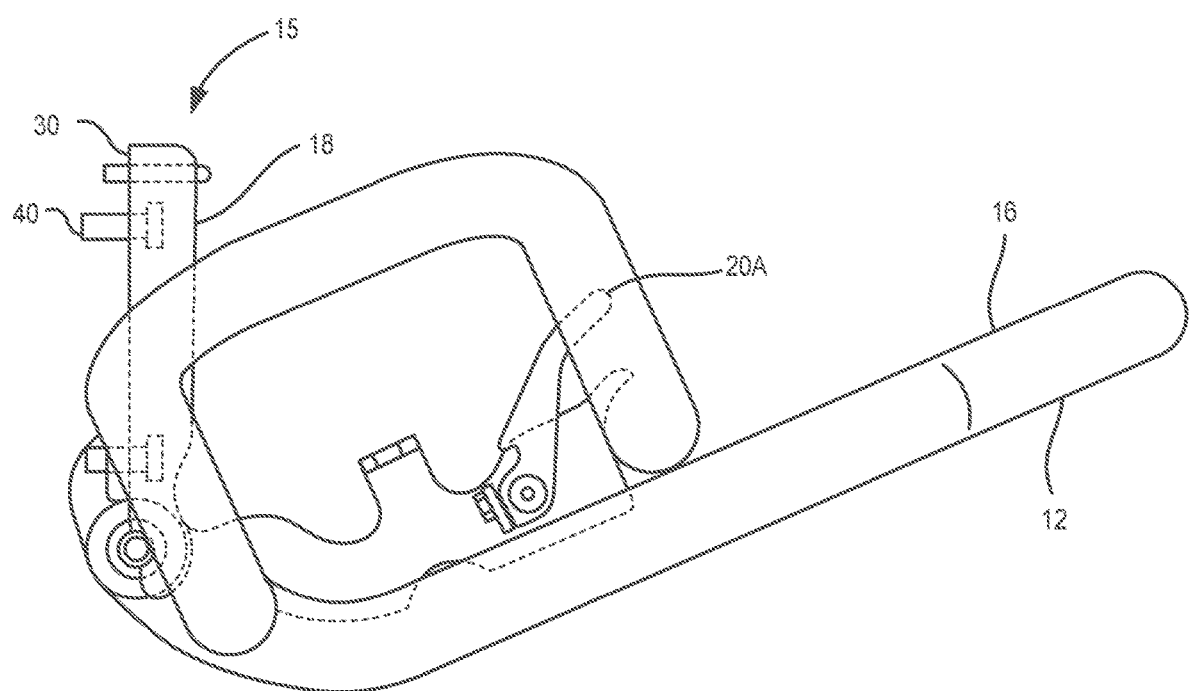
FIG. 8 is a cross-sectional view of an exemplary embodiment of the latching system.

FIG. 8 depicts a cross-sectional view of an exemplary embodiment of the latching system 15 comprising a grill guard coupling portion 16 and a vehicle coupling portion 18 and grill guard assembly 12 according to an exemplary embodiment of the quick release grill guard.

Figure 9:
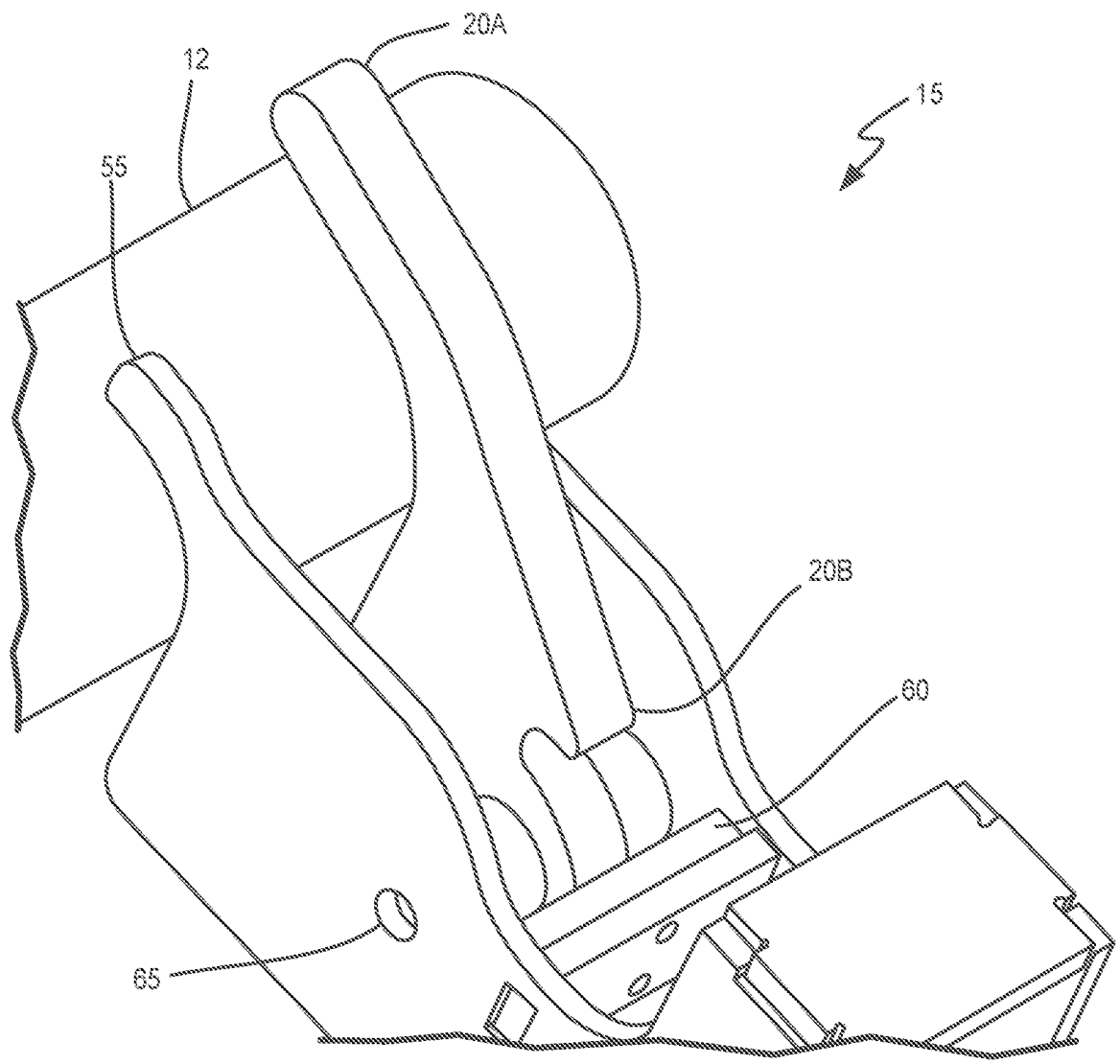
FIG. 9 is a close-up perspective view of the latching system showing one embodiment of the release member, according to one implementation.

FIG. 9 depicts a close-up perspective view of an exemplary embodiment of the latching system 15 showing an implementation of the coupling region of the release member 20B wherein the release member 20 has been disengaged from the catch (not shown).

FIG. 10 shows a rear perspective view of an exemplary embodiment of the latching system 15 in an open configuration.

Figure 11:
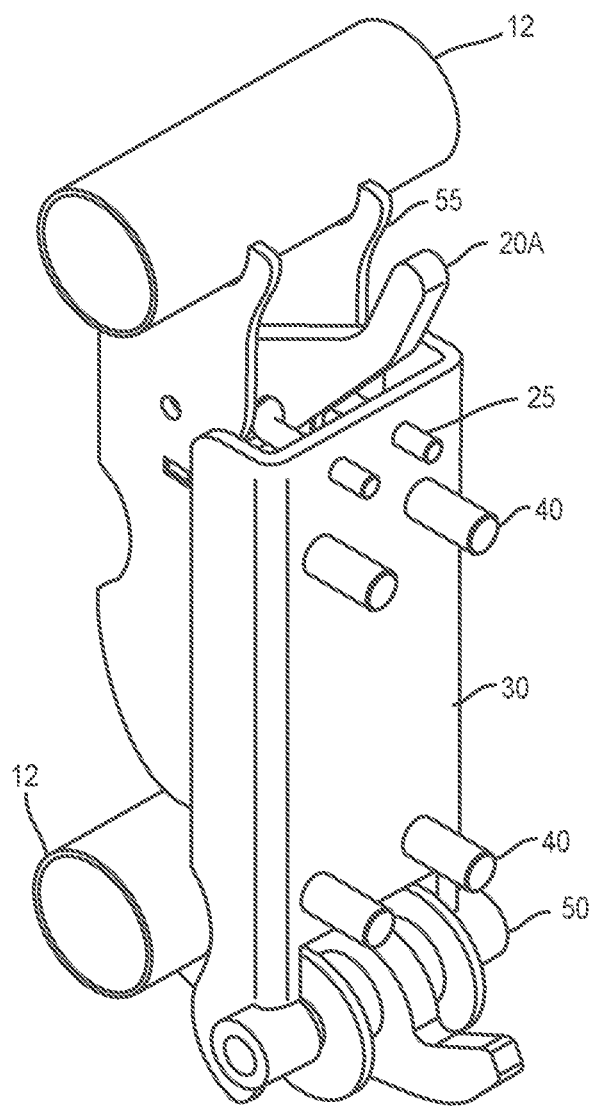
FIG. 11 is a reverse perspective view of the latching system of FIG. 10 in an closed position, according to one implementation.

FIG. 11 shows a rear perspective view of an exemplary embodiment of the latching system 15 in a closed configuration.

Figure 12:
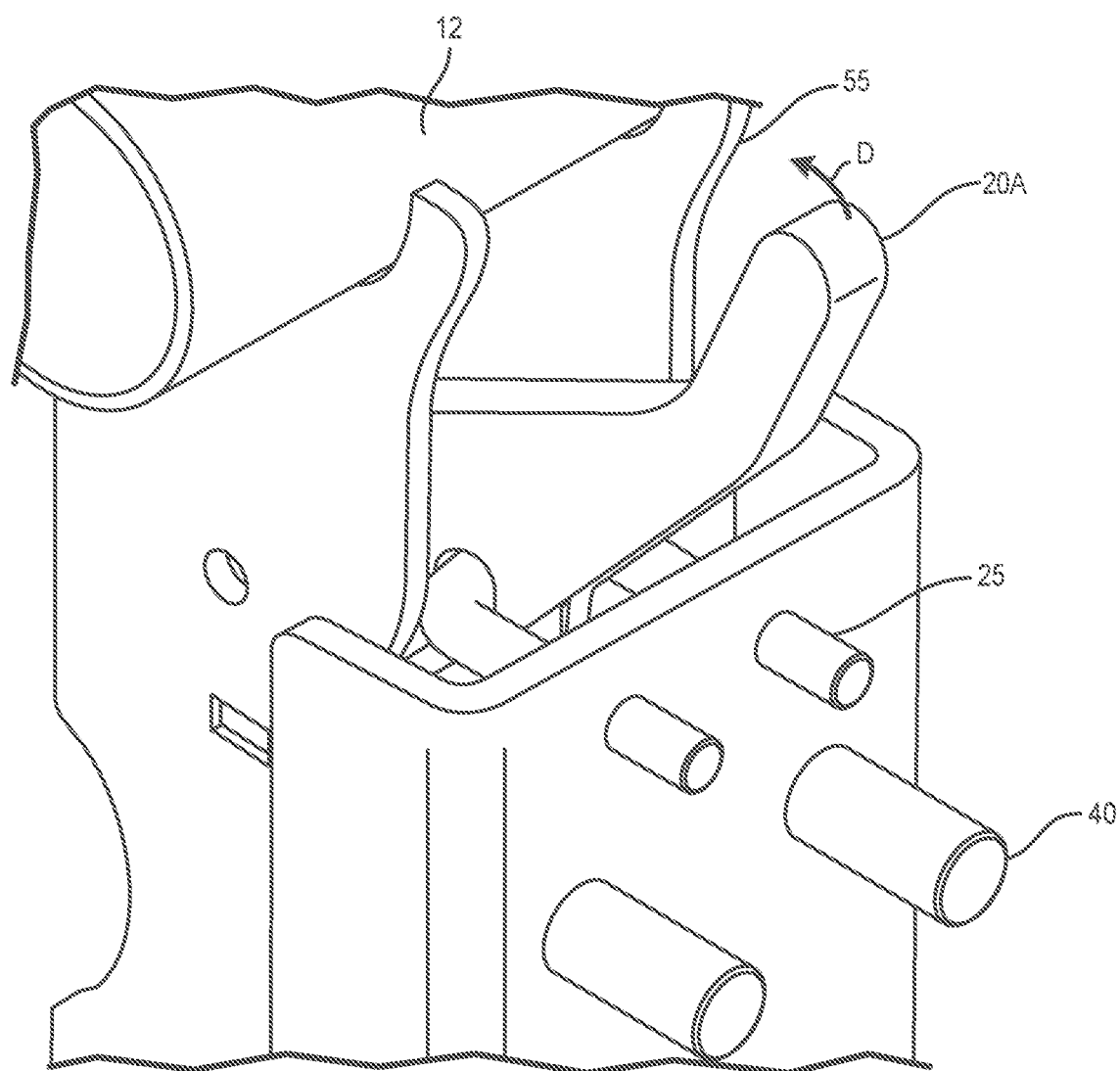
FIG. 12 is a close-up view of the release member depicted in FIG. 11, according to one implementation.

FIG. 12 depicts a close-up view of one embodiment of the system showing certain implementations of the coupling region of the release member 20B when the release member 20 is engaged to the catch 25. In certain implementations, and as best shown in FIG. 12, the release is triggered by manually moving the operable portion away from the catch 25 as shown by reference arrow D. In this way, in certain implementations, the system can be operated by hand.

Figure 13B:
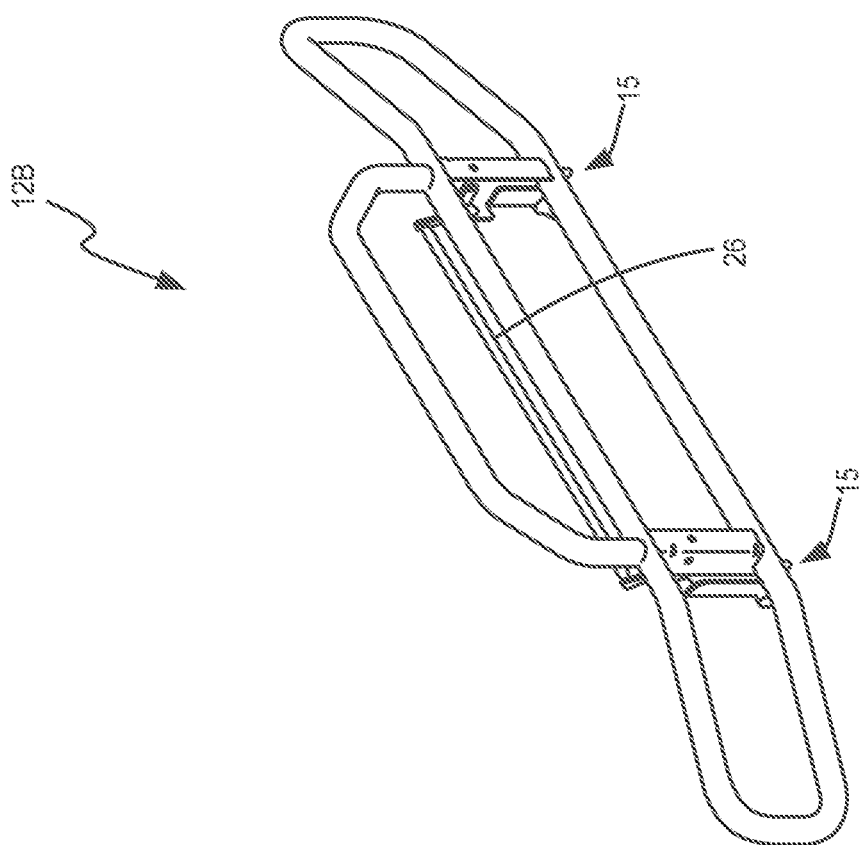
FIG. 13B is a perspective view of the quick release grill guard, according to an exemplary embodiment having a single-looped grill.
Figure 13A:
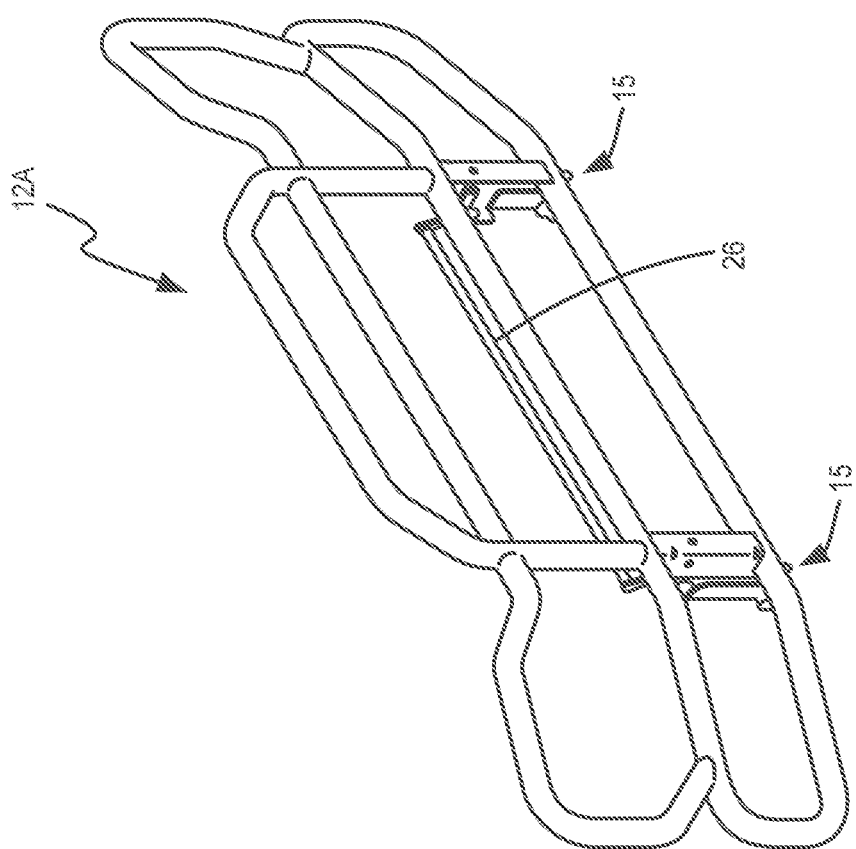
FIG. 13A is a perspective view of the quick release grill guard, according to a second exemplary embodiment having a double-looped grill.
Figure 14A:
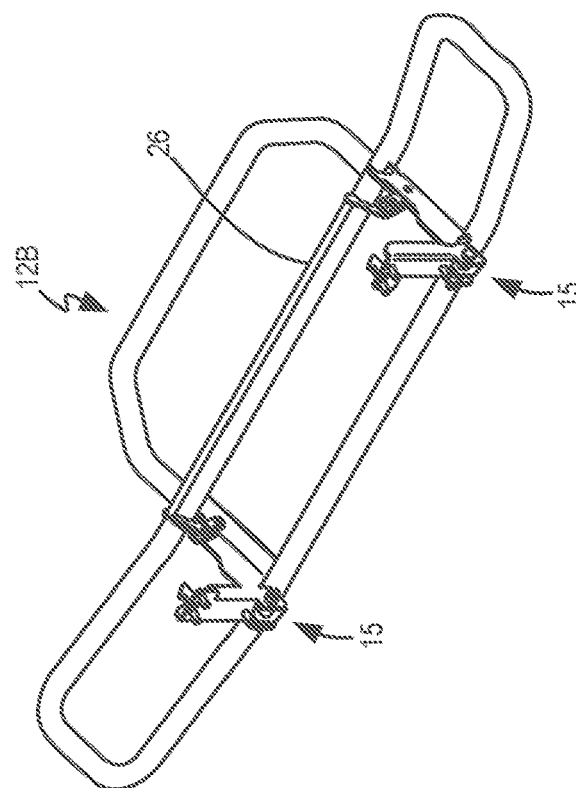
FIG. 14A is a perspective view of the quick release grill guard in the open position, according to the embodiment of FIG. 13A.
Figure 14B:
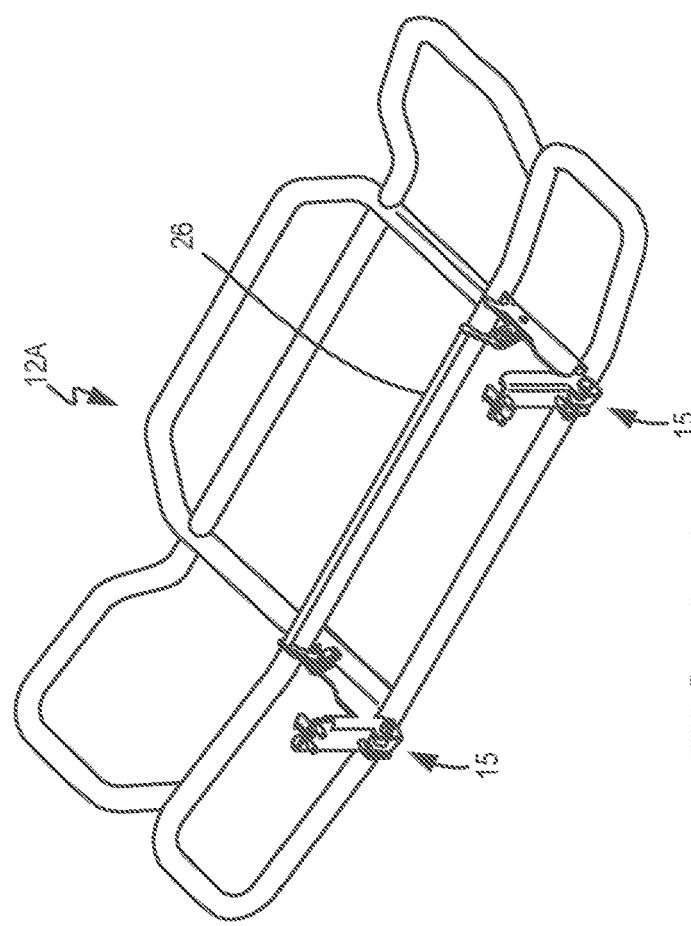
FIG. 14B is a perspective view of the quick release grill guard in the open position, according to the embodiment of FIG. 13B.

FIG. 13A-29 depict the quick release grill guard 10 according to alternative embodiments which further comprises a single operation handle, or quick release bar 26. In these embodiments, a plurality of latching systems 15 are operated simultaneously by way of the quick release bar 26. FIGS. 13A-13B depict perspective views of exemplary embodiments of the quick release grill guard 10 comprising double-looped (shown at 12A in FIG. 13A) and single-looped (shown at 12B in FIG. 13B) guard configurations, which are among several grill guard configurations which are well-established in the art. FIGS. 14A-14B also depict views of the quick release grill guard 10 comprising the quick release bar 26, wherein the grill guard assembly 12 has been moved away from the vehicle (not shown).

Figure 16:
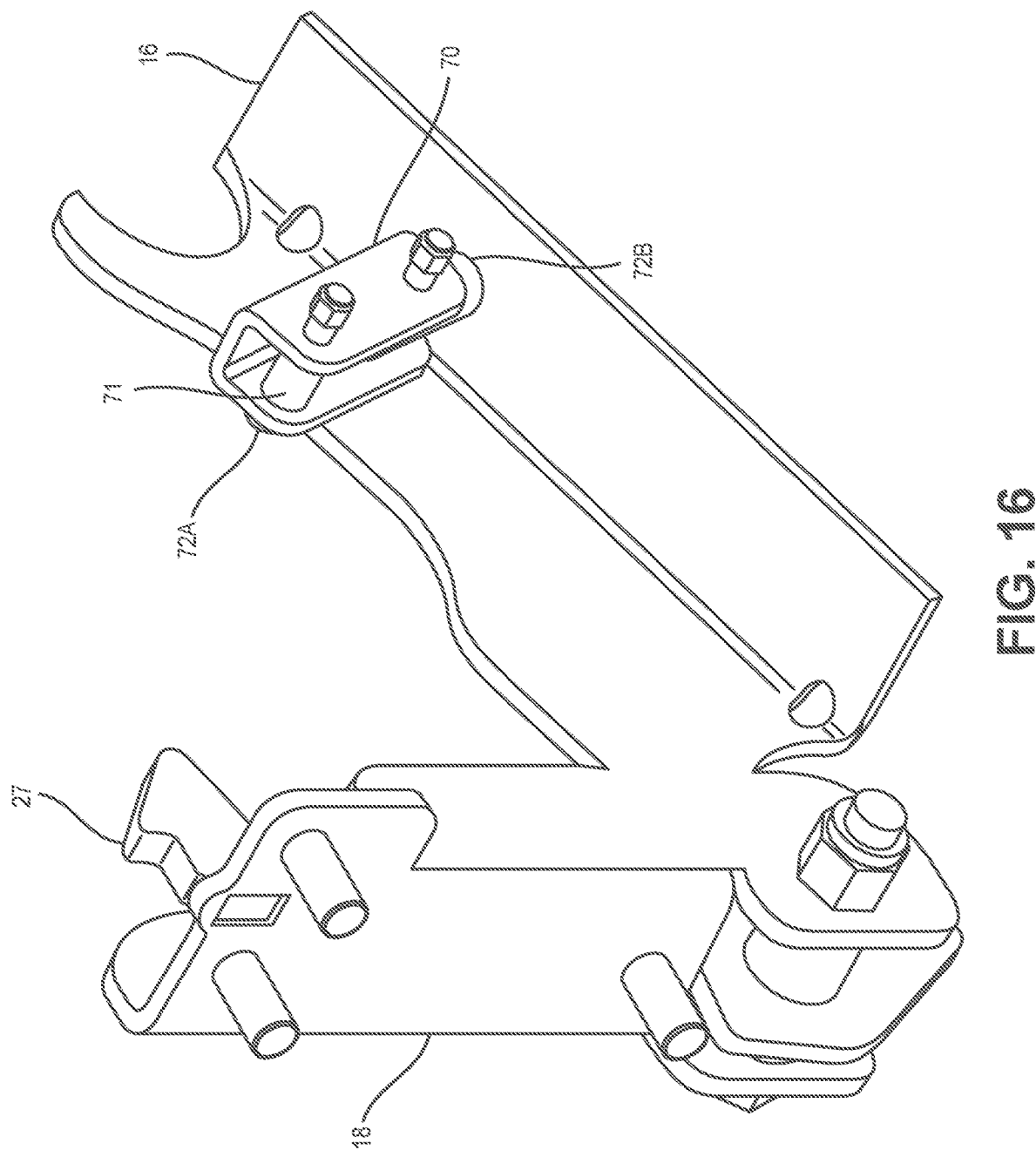
FIG. 16 is a close-up perspective view of the latching system of FIG. 15, in an open position, according to one implementation.
Figure 25:
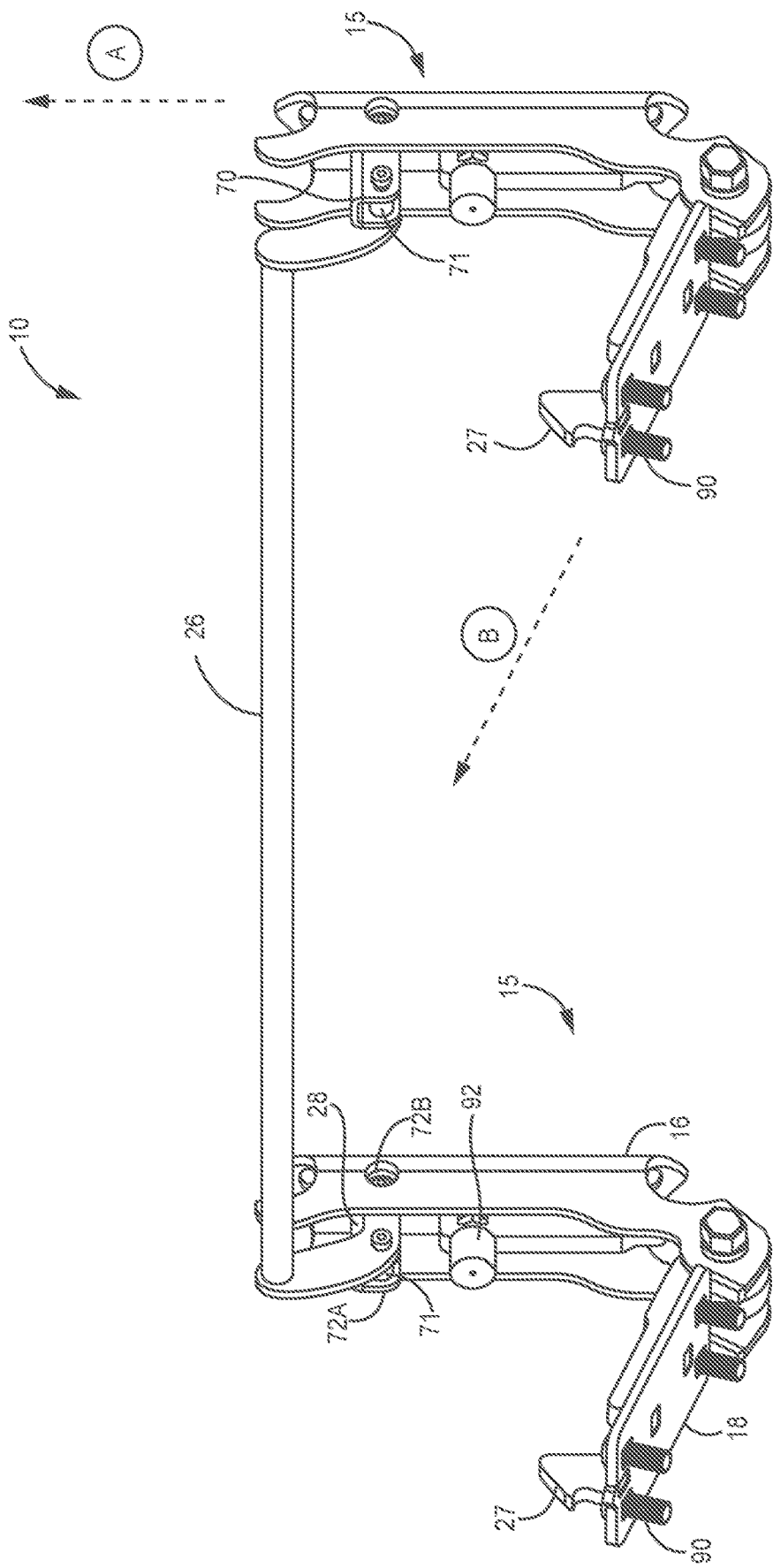
FIG. 25 is a perspective view of the quick release grill guard comprising a latching system further comprising a quick release bar, according to one implementation.

FIGS. 15, 20 and 25 depict a perspective view exemplary embodiments of the quick release grill guard 10 further comprising the single operation handle or quick release bar 26. FIG. 16 depicts a close-up perspective view of the latching system 15 adapted for the quick release bar 26. In these and other embodiments, the quick release bar 26 is operably coupled to a clasping member 70, which further comprises a latching pin 71. This coupling can be achieved, for example, by way of a plurality of fasteners 72A, 72B which attach the clasping member 70 to the quick release bar 26 by way of a coupling region 28.

In various embodiments, the coupling region 28 is substantially planar, and may take the form of an "L," or other acute or obtuse angle, would be apparent to one of skill in the art. In certain embodiments, the clasping member 70 is formed by extruded metal and takes the shape of an inverted U-beam.

Figure 17:
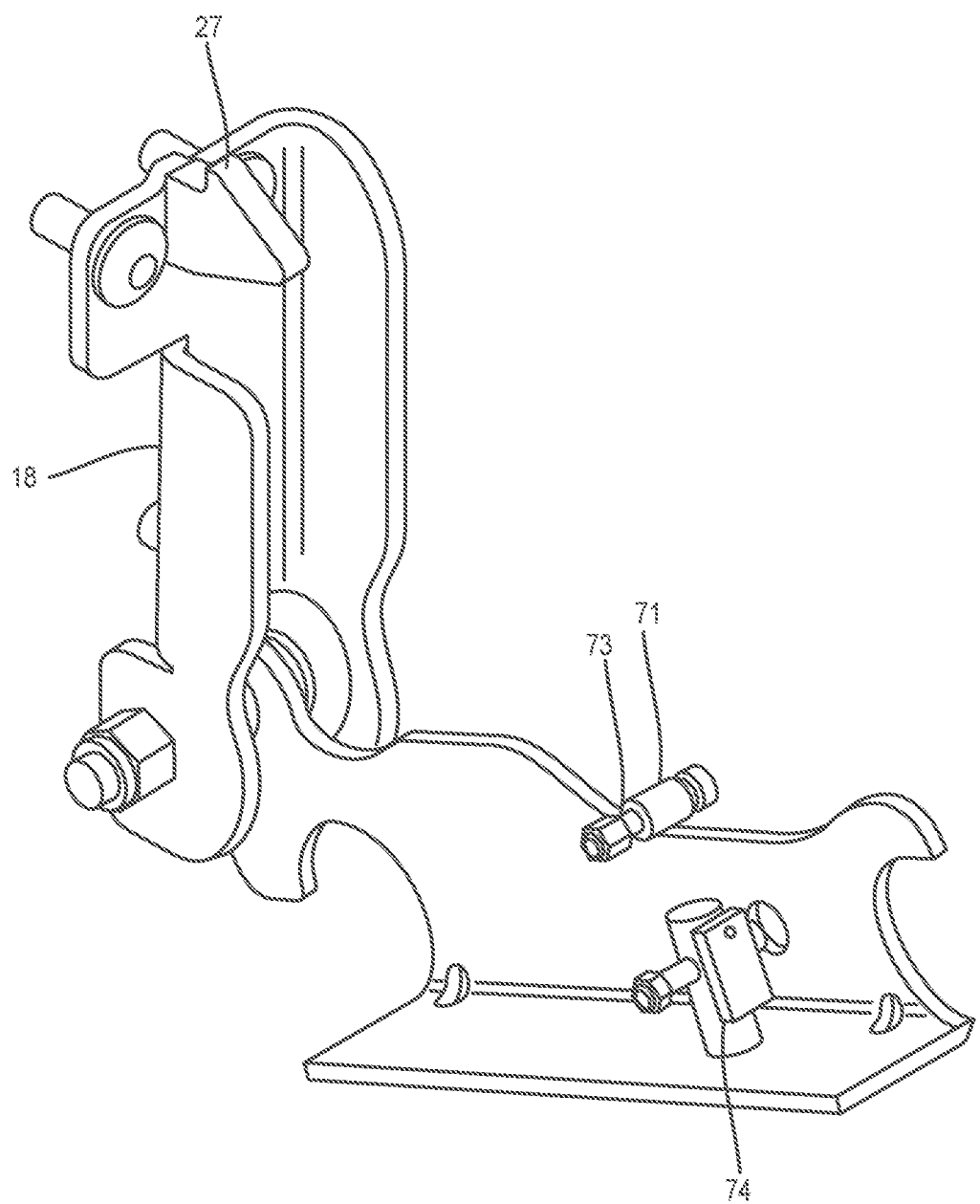
FIG. 17 is a reverse perspective view of the latching system of FIG. 16, according to one implementation.

In various embodiments, the latching pin 71 is a bushing, such as a nylon bushing, which is seated in the clasping member 70 by way of an axle (shown at 73 in FIG. 17) which is connected to the first fastener 72A. In certain embodiments, a second fastener 72B can also comprise a hinge (shown as 75 in FIGS. 18A-18B) which allows movement of the quick release bar relative to the grill guard coupling portion 16 so as to actuate the release of the clasping member 70 from the clasped member 27, which is capable of locking with the latching pin 71 by way of a spring (best shown in FIG. 17 at 74). FIG. 17 depicts an opposite perspective view of an exemplary embodiment of the quick release grill guard 10 depicted in FIG. 16, and showing the spring 74.

Figure 18B:
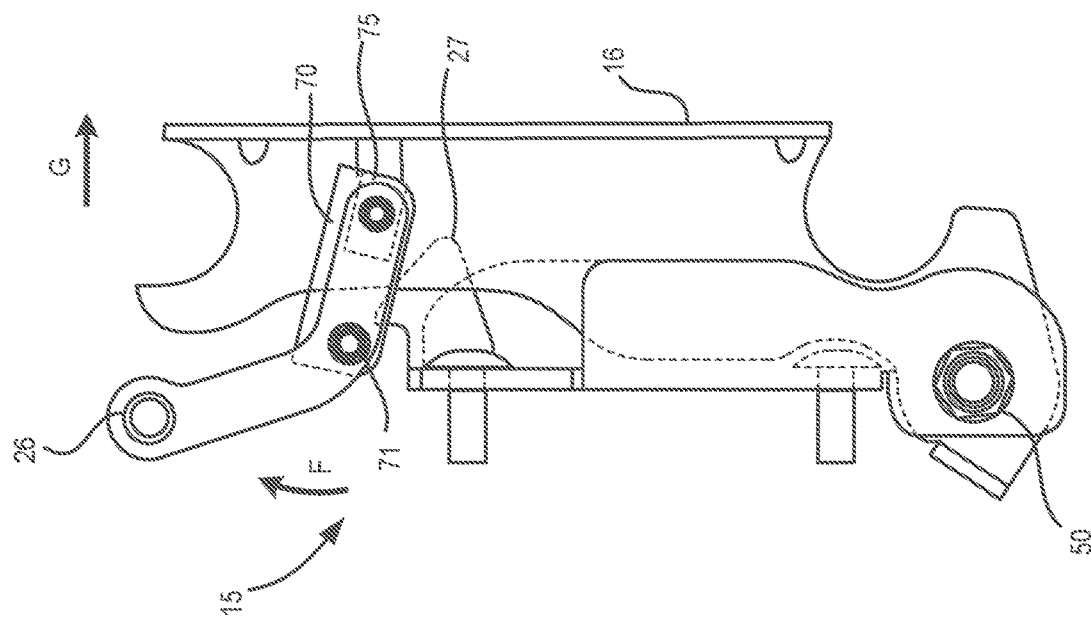
FIG. 18B is a cross-sectional view of an exemplary embodiment of the quick release grill guard wherein the quick release bar is in the open position.
Figure 18A:
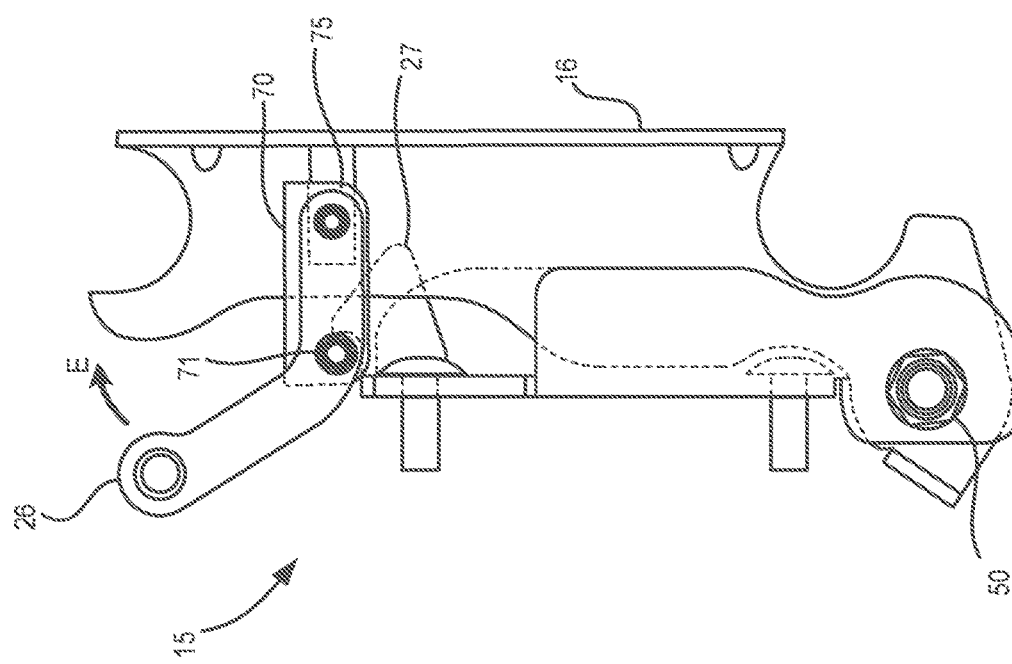
FIG. 18A is a cross-sectional view of an exemplary embodiment of the quick release grill guard wherein the quick release bar is in the closed, or locked position.
Figure 19:
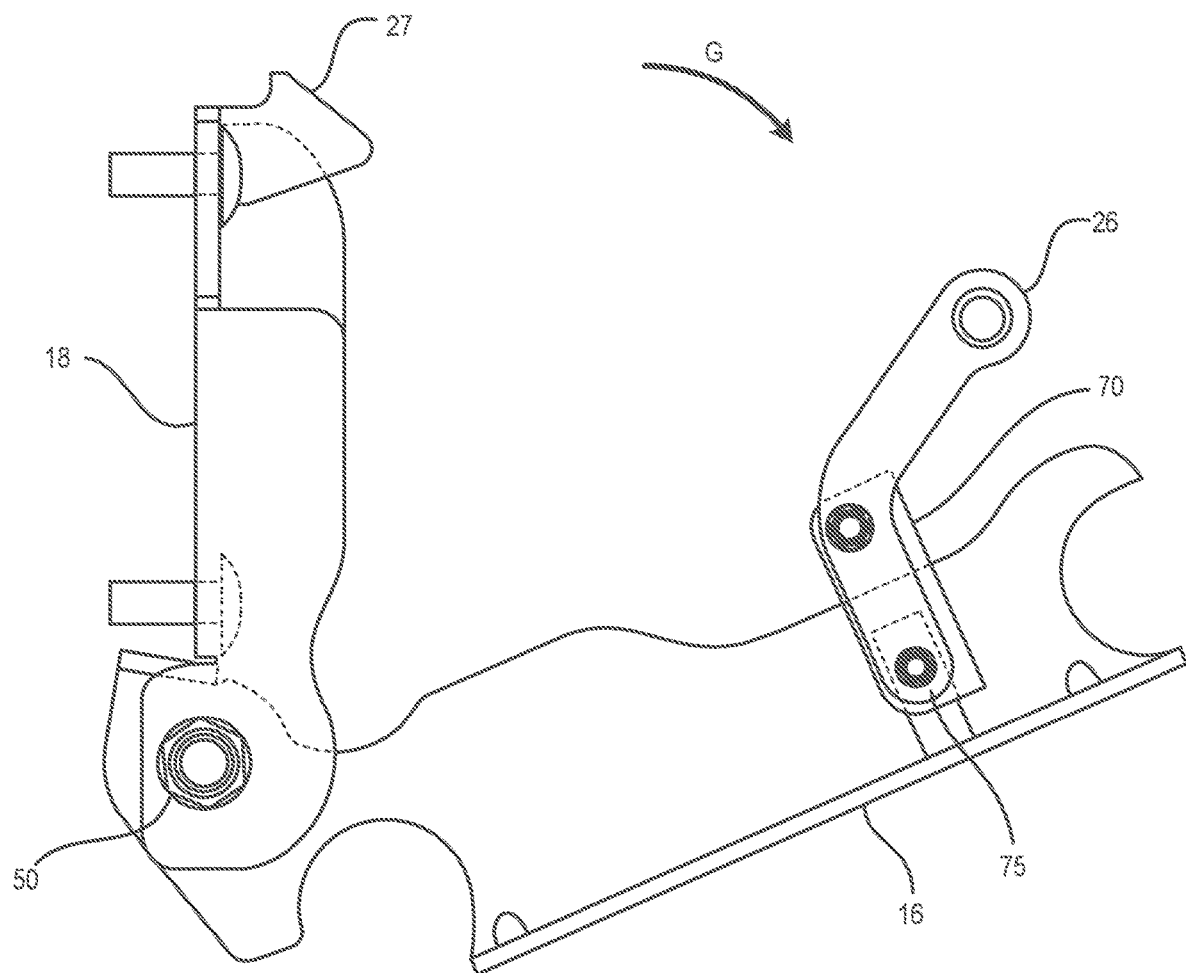
FIG. 19 is a cross-sectional view of an exemplary embodiment of the quick release grill guard wherein the quick release bar is in the open position and the grill guard coupling portion has been pivoted away from the grill.

FIGS. 18A-19 depict cross-sectional views of exemplary embodiments of the latching system 15 comprising the quick release bar 26 and showing the actuation of the clasping member 70. In these embodiments, the latching pin 71 is normally nested in the clasped member 27 so as to lock the grill guard in alignment with the grill, as is described elsewhere herein. When the user wishes to pivot the grill guard away from the face of the grill, the user may raise the quick release bar 26, as depicted by the reference arrow E. In so doing, the latching pin is disengaged from the clasped member 27 (as shown by reference arrow F), so as to free the grill guard coupling portion 16 to pivot about the hinge 50 (and in the direction of reference arrow G).

FIGS. 20-24 show an additional exemplary implementation of a grill guard 10 with a single operation handle or quick release bar 26. Again, in these implementations under normal operating conditions the grill guard assembly is normally in a first position, wherein the axis of the grill guard (designated by the line at A) is substantially parallel or otherwise aligned with the grill (designated by the line at B) of a vehicle such as a semi (not shown). However, the system 10 is configured such that when it is desired, the latching systems 15 may be operated so as to reposition the axis of the grill guard A away from the axis of the grill B.

Figure 21A:
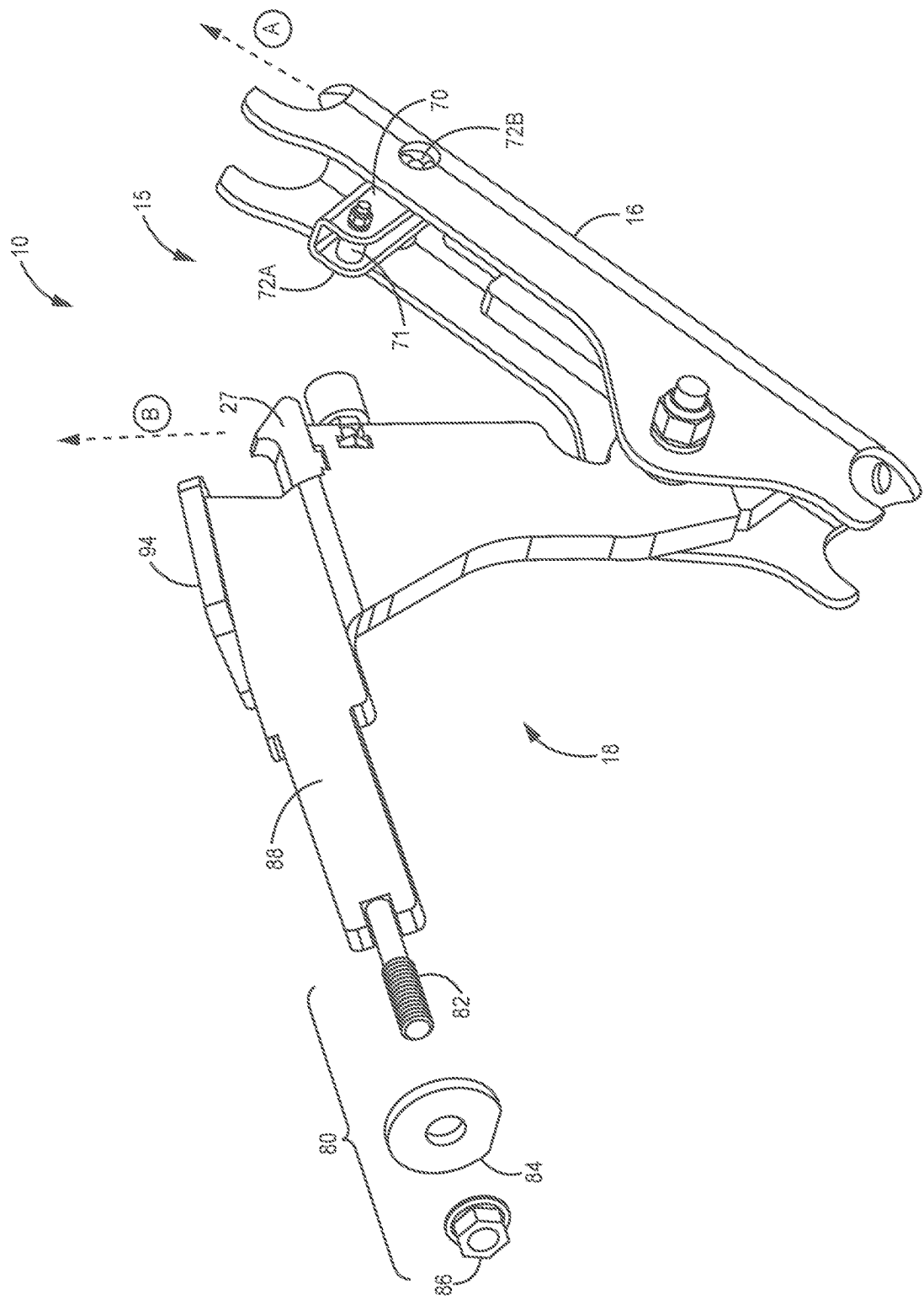
FIG. 21A is a close-up perspective view of the latching system of FIG. 20, in an open position, according to one implementation.
Figure 21B:
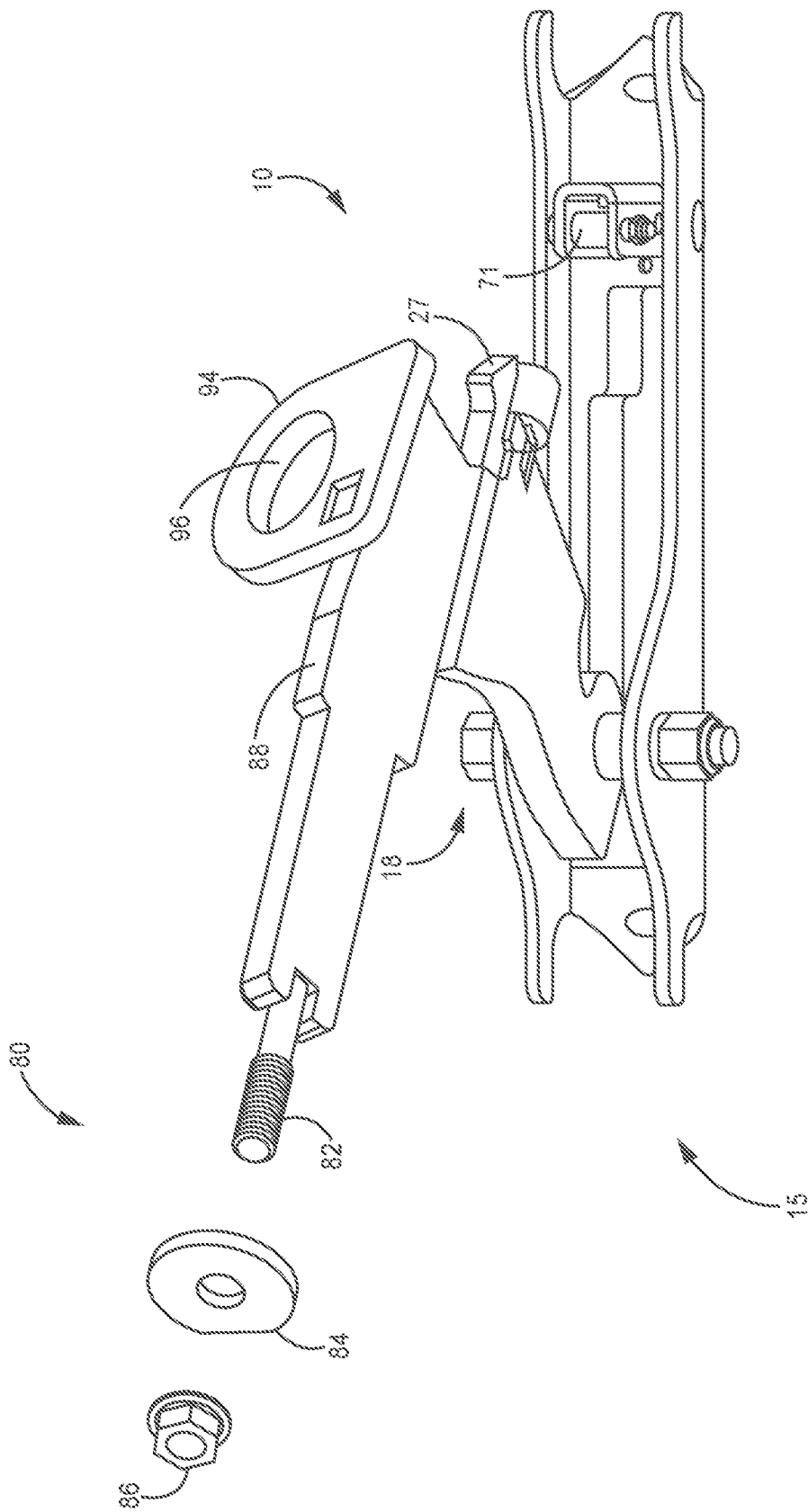
FIG. 21B is a reverse perspective view of the latching system of FIG. 21, according to one implementation.
Figure 22A:
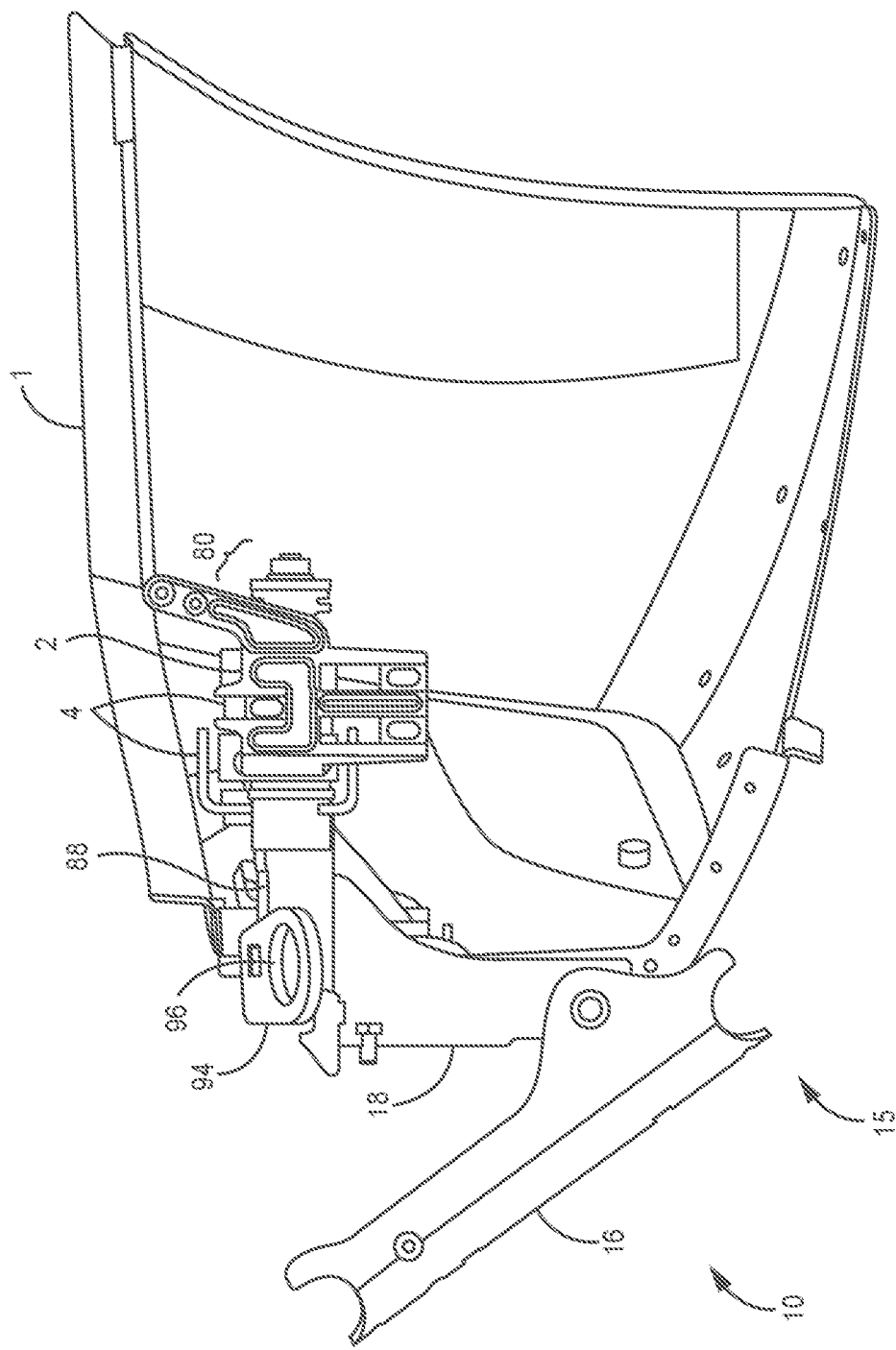
FIG. 22A is a side view of the vehicle coupling portion according to one embodiment attached to a receiver.
Figure 22B:
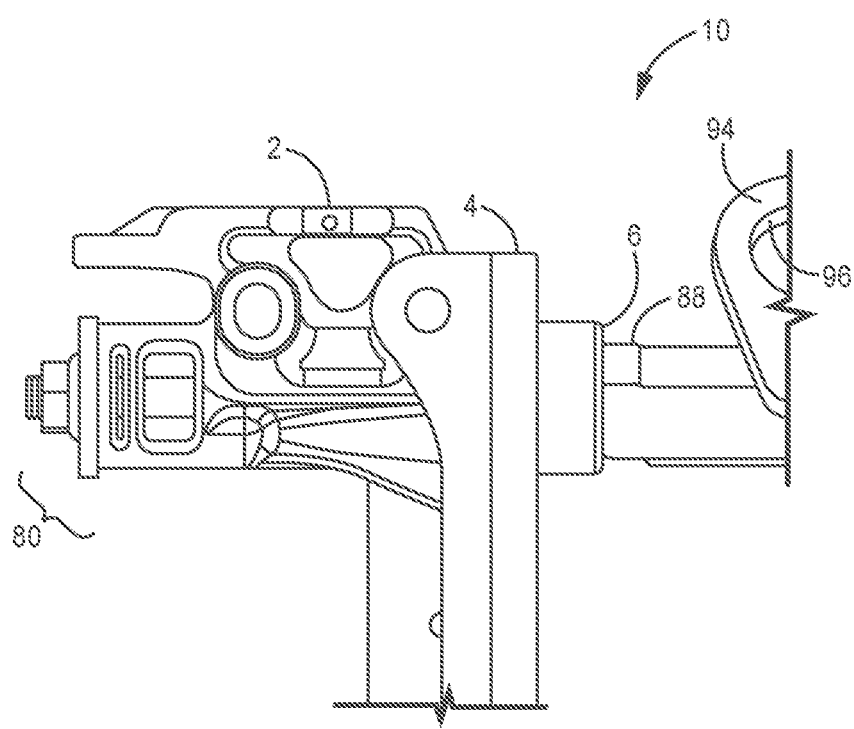
FIG. 22B is a close-up side view of the implementation of FIG. 22A.
Figure 22C:
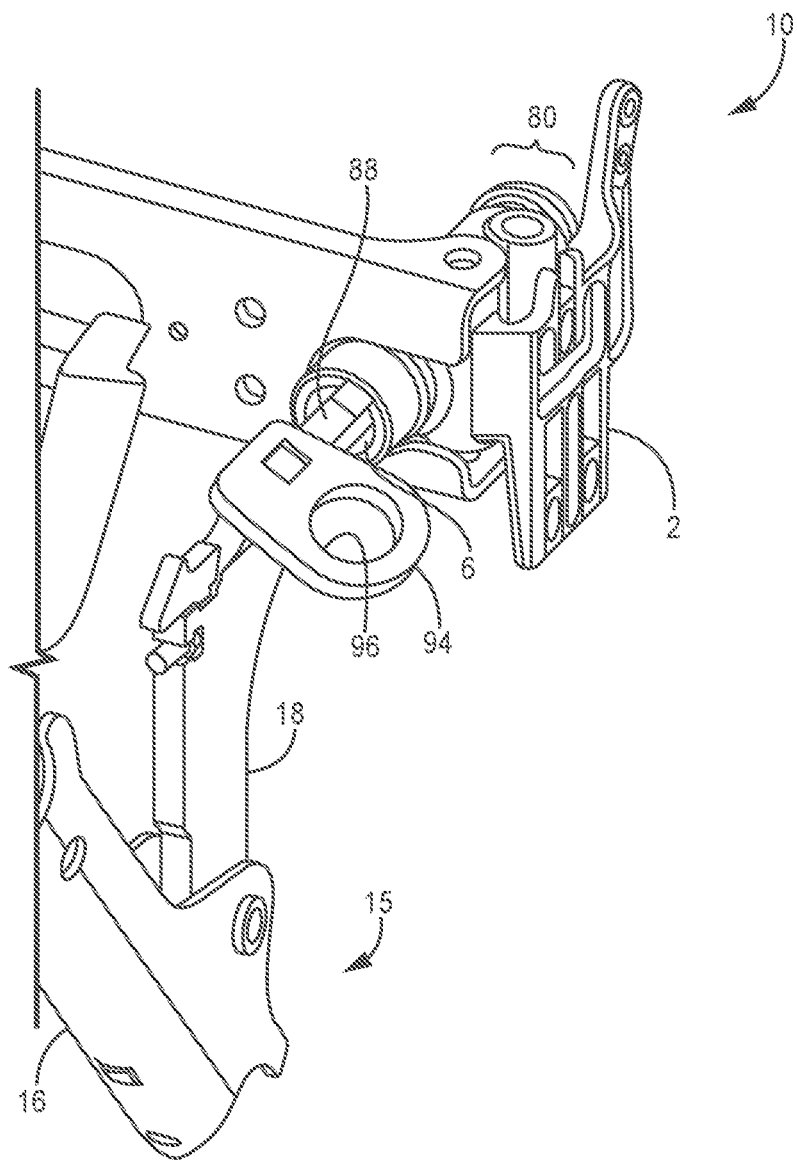
FIG. 22C is a perspective view of the implementation of FIG. 22A.
Figure 22D:
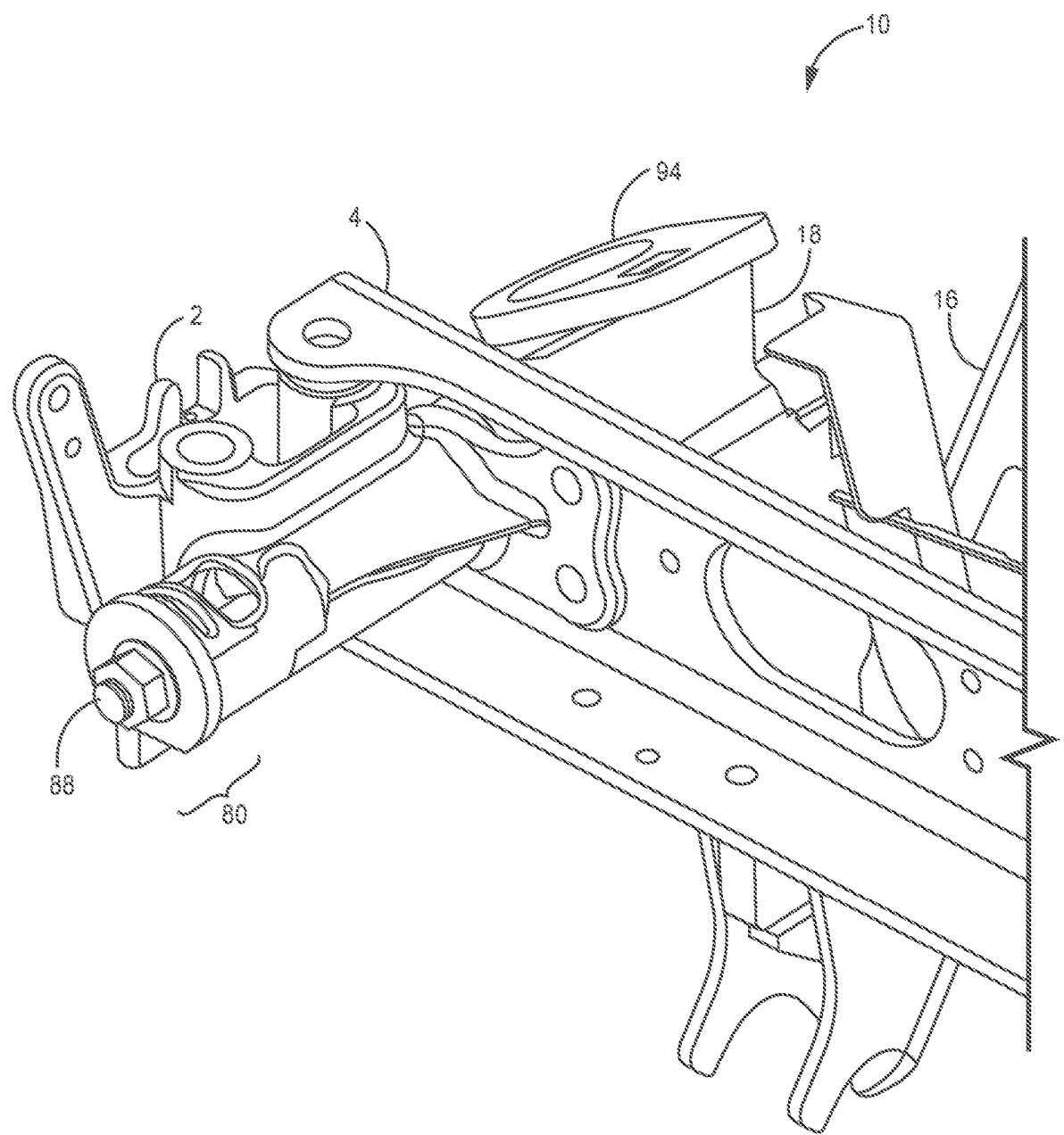
FIG. 22D is a reverse perspective view of the implementation of FIG. 22A.

FIGS. 21A and 21B depict close up views of the latching system 15 and fastener system 80 constructed for use with a quick release bar (shown at 26 in FIG. 20). The quick release bar 26 is operatively engaged with the clasping member 70, as described above. In these and other implementations, the clasped member 27 is configured to be engaged with the latching pin 71. In various implementations, the latching pin 71 is nested within the clasping member 70 and may rotate via a hinge 72B when the bar (shown for example at 26 in FIG. 20) is actuated, as described above.

In the implementations of FIGS. 20-24, and as best shown in FIGS. 22A-22D, the vehicle coupling portion 18 is constructed and arranged to fit within a aperture 6 of the vehicle 1 for attachment to the vehicle tow points at the receivers 2. While the system 15 according to FIGS. 22A-22D is depicted in relation to a system 15 having a quick release bar 26, it is understood that the fastening system 80 can be used with any latching system 15, such as those shown in FIGS. 1-14, 30-33 or elsewhere in this application.

Continuing with FIGS. 22A-22D, the vehicle coupling portion 18 may be releasably attached to the vehicle via a vehicle-specific fastener system 80 configured to extend through apertures 6 on the front of the vehicle 1 and directly bolt to the vehicle frame 4 via the tow point receivers 2, rather than requiring any mounting plate. In some implementations, the fastener system 80 is connected to an elongate member 88 shaped and sized to extend through the aperture 6 of the desired vehicle, as would be readily appreciated.

In various implementations, and as shown in FIGS. 21A-22D, the fastener system 80 includes an elongate member 88 ending with a threaded bolt 82 or other fastener as would be known by those of skill in the art to be sized for insertion into or otherwise fixedly attaching to the vehicle tow point receivers 2 in the vehicle frame 4. In these and other implementations, the vehicle coupling portion 18 is additionally held in place via the fastener system 80 comprising the threaded bolt 82 as well as a washer 84 and nut 86 at the distal end of the elongate member 88, though it is appreciated that the various component(s) of the fastener system 80 are of course contemplated for alternate receiver 2 types. For example, in certain implementations the elongate member has an opening which a pin is inserted into to secure the vehicle coupling portion 18 to the receiver 2. Further alternate implementations would be readily appreciated by those of skill in the art with familiarity with the various receivers 2 in the art.

In these implementations, and as shown the fastener system 80 is sized and shaped to allow for direct connection of the vehicle coupling portion 18/elongate member 88 to the frame 4 of the vehicle via the tow point receivers 2 disposed on the front ends of vehicles, such as those on Freightliner®, Hino®, International®, Kenworth®, Mack®, Peterbilt®, Volvo®, Western Star® and other major semi manufacturers. In some implementations, the fastening system 80 and/or elongate member 88 is configured to be customizable for various vehicle attachments, as would be recognized by those of skill in the art.

Figure 23A:
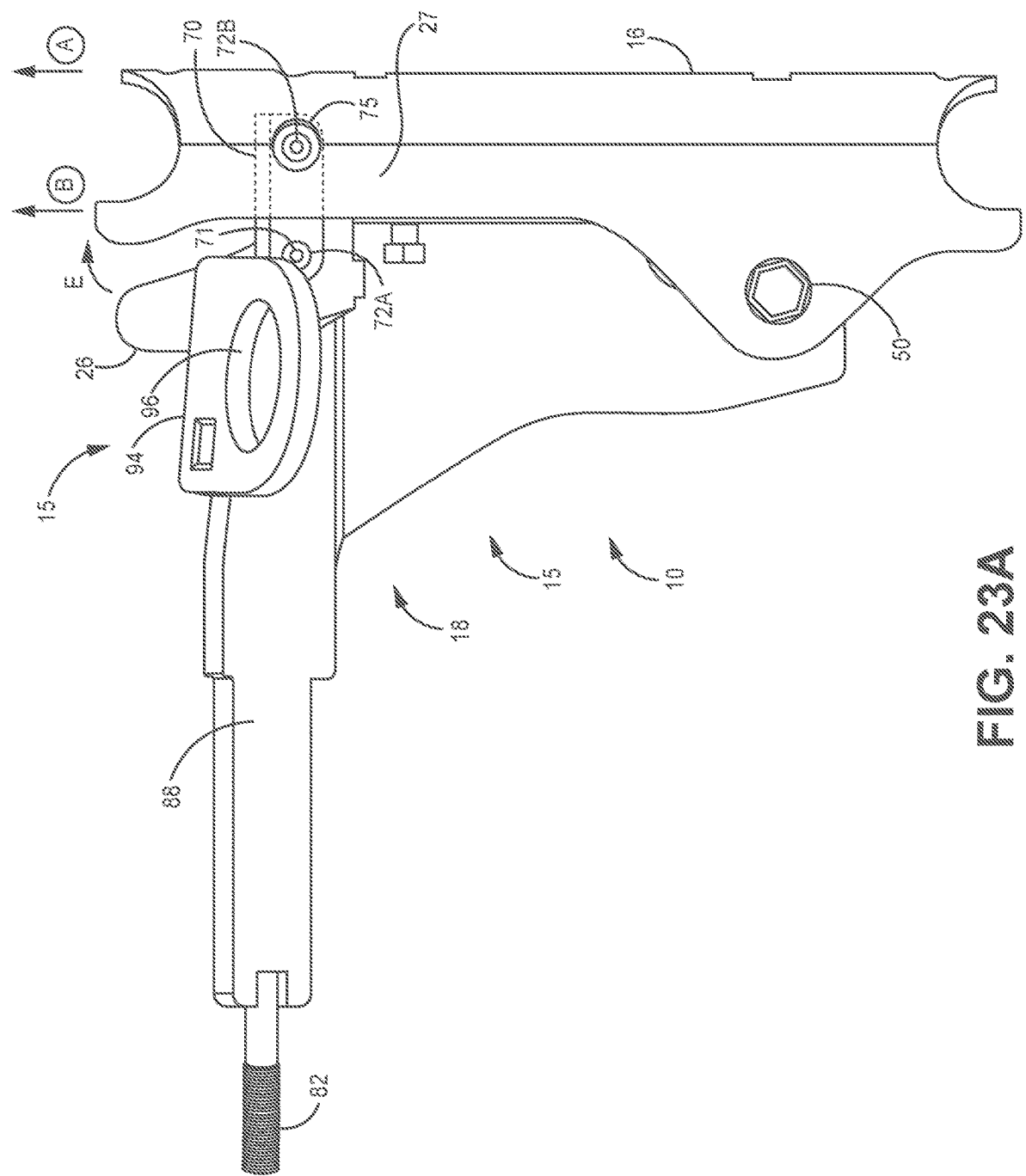
FIG. 23A is a cross-sectional view of an exemplary embodiment of the quick release grill guard wherein the quick release bar is in the closed, or locked position.
Figure 23B:
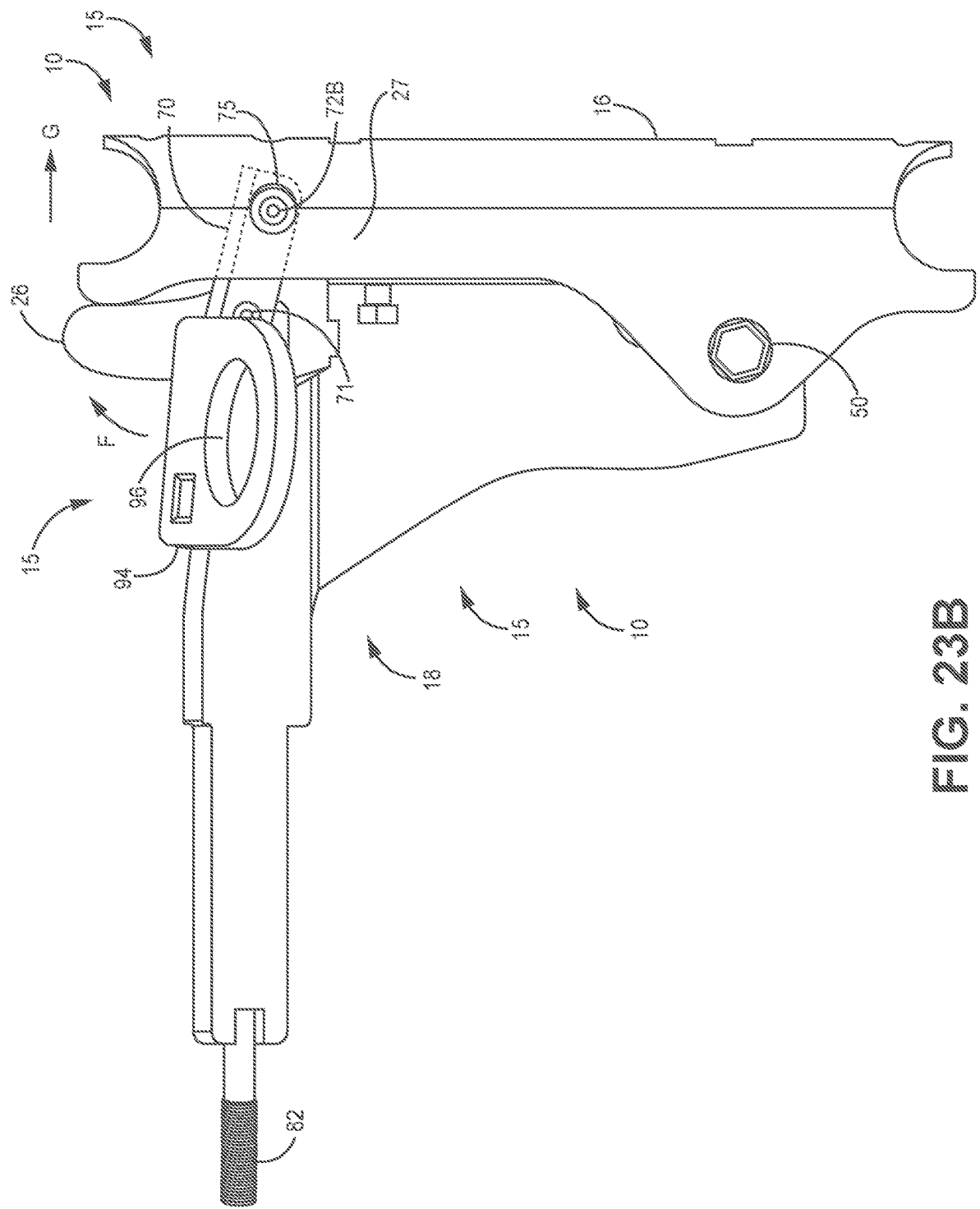
FIG. 23B is a cross-sectional view of an exemplary embodiment of the quick release grill guard wherein the quick release bar is in the open position.
Figure 24:
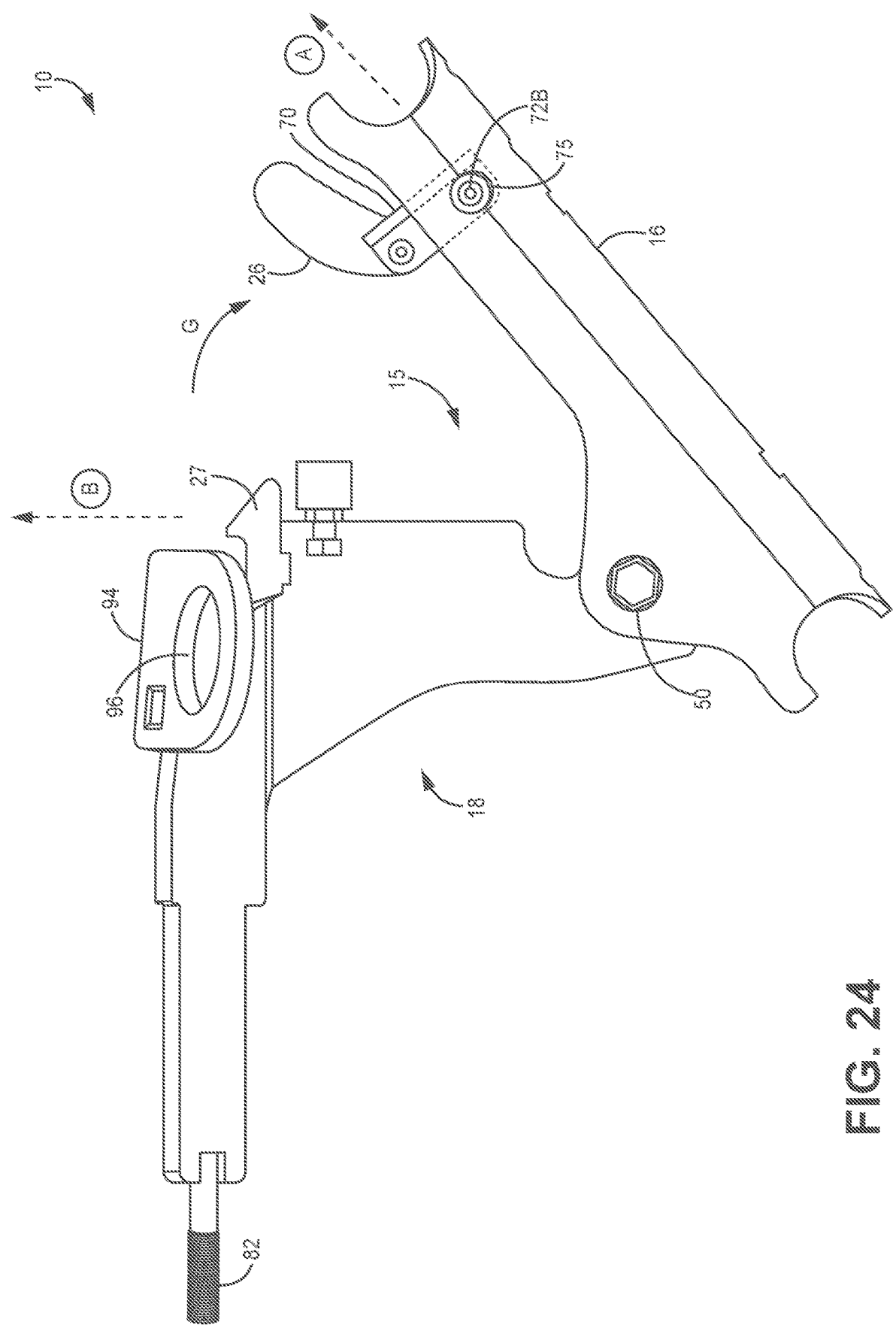
FIG. 24 is a cross-sectional view of an exemplary embodiment of the quick release grill guard wherein the quick release bar is in the open position and the grill guard coupling portion has been pivoted away from the grill.

FIGS. 23A-24 depict side views of various implementations of the latching system 15 comprising a quick release bar 26 and a clasping member 70. In some implementations, the second fastener 72B may comprise a hinge 75 such that when the quick release bar 26 is actuated in the direction of reference arrow E the quick release bar 26 pivots around the axel of the hinge 75. As the quick release bar 26 is actuated the latching pin 71 is urged in the direction of reference arrow F. As the quick release bar 26 and latching pin are urged in the direction of reference arrows E and F, respectively, the latching pin 71 disengages the clasped member 27. By disengaging the clasped member 27 the grill guard and grill guard coupling portion 16 may be pivoted away from the face of the vehicle.

It will be appreciated that the use of the vehicle tow points as mounting points for the vehicle coupling portion 18 deprive the vehicle of usable towing points while the grill guard is attached. As such, and as is also shown in FIGS. 23A-24, various implementations of the vehicle coupling portion 18 feature a towing mount 94. In these implementations, the towing mount 94 is a flange defining a tow opening 96, though many other configurations that would be suitable for affixing to the vehicle coupling portion 18 to be used in towing would be readily appreciated by those of skill in the art.

Figure 26:
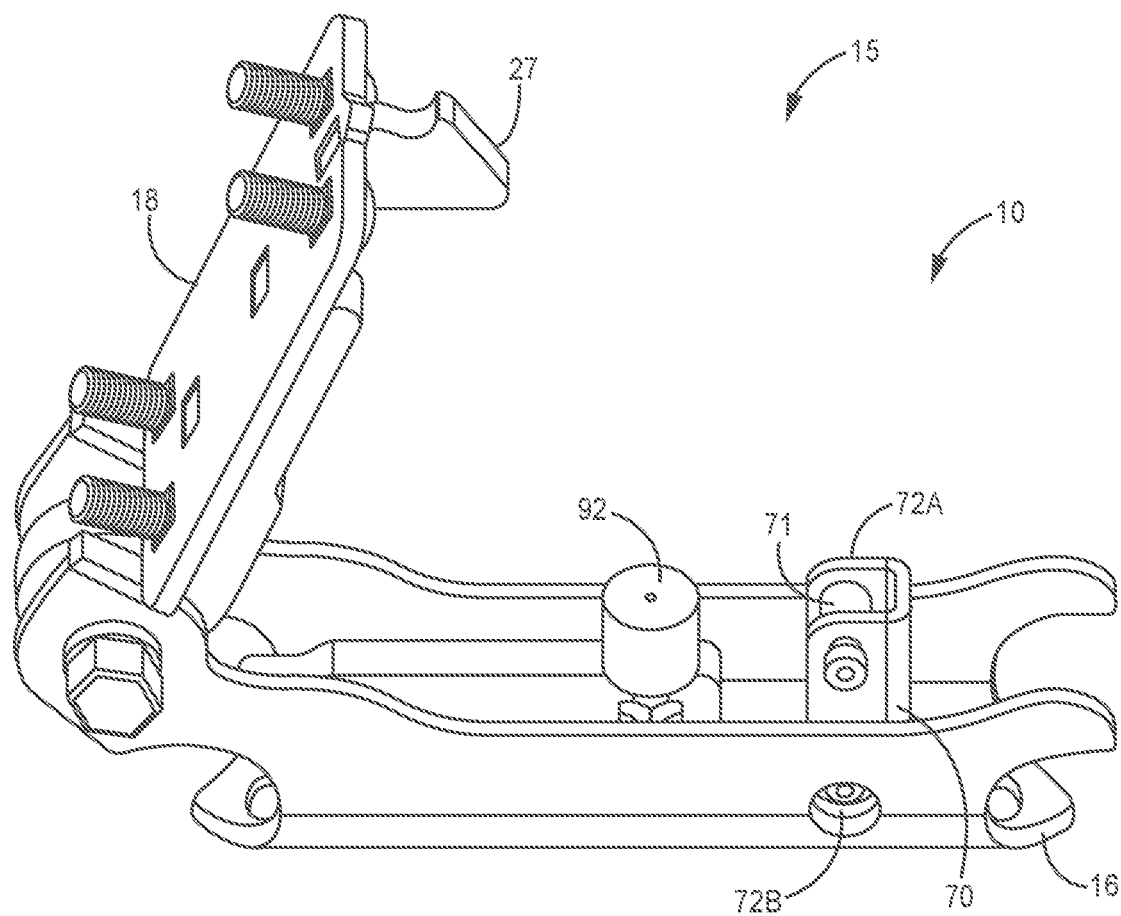
FIG. 26 is a close-up perspective view of the latching system of FIG. 25, in an open position, according to one implementation.
Figure 27:
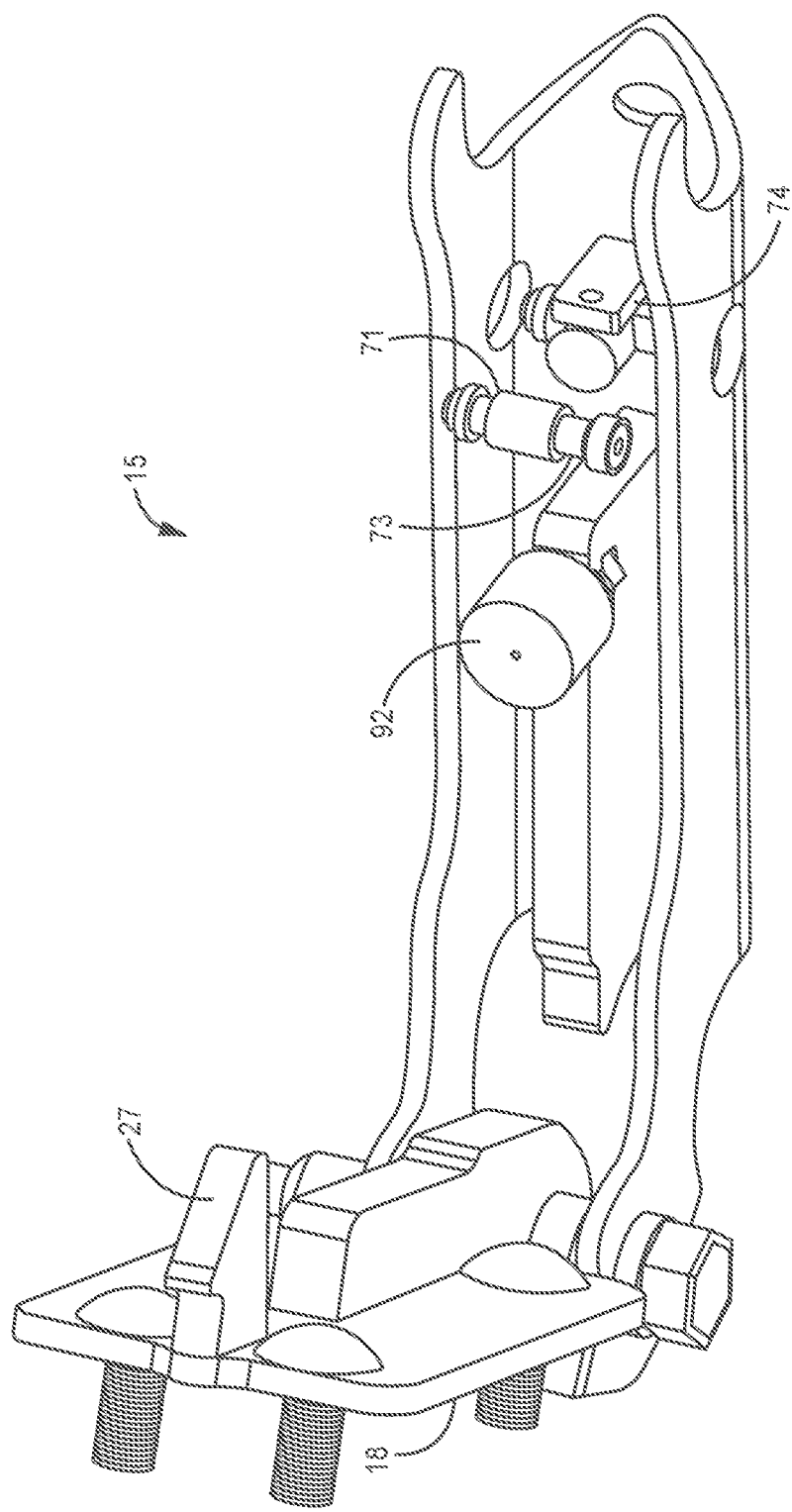
FIG. 27 is a reverse perspective view of the latching system of FIG. 26, according to one implementation.
Figure 28A:
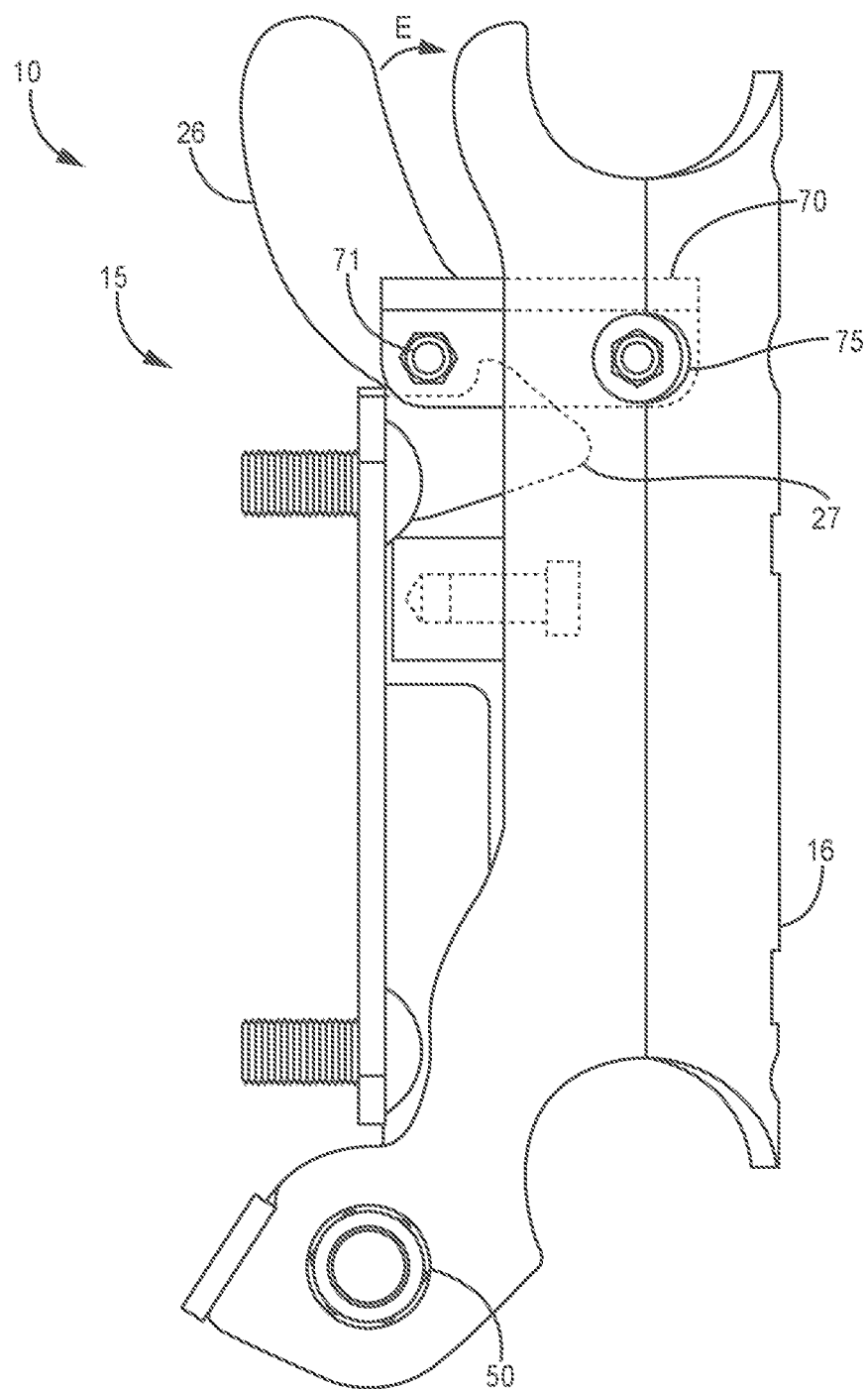
FIG. 28A is a cross-sectional view of an exemplary embodiment of the quick release grill guard wherein the quick release bar is in the closed, or locked position.
Figure 28B:
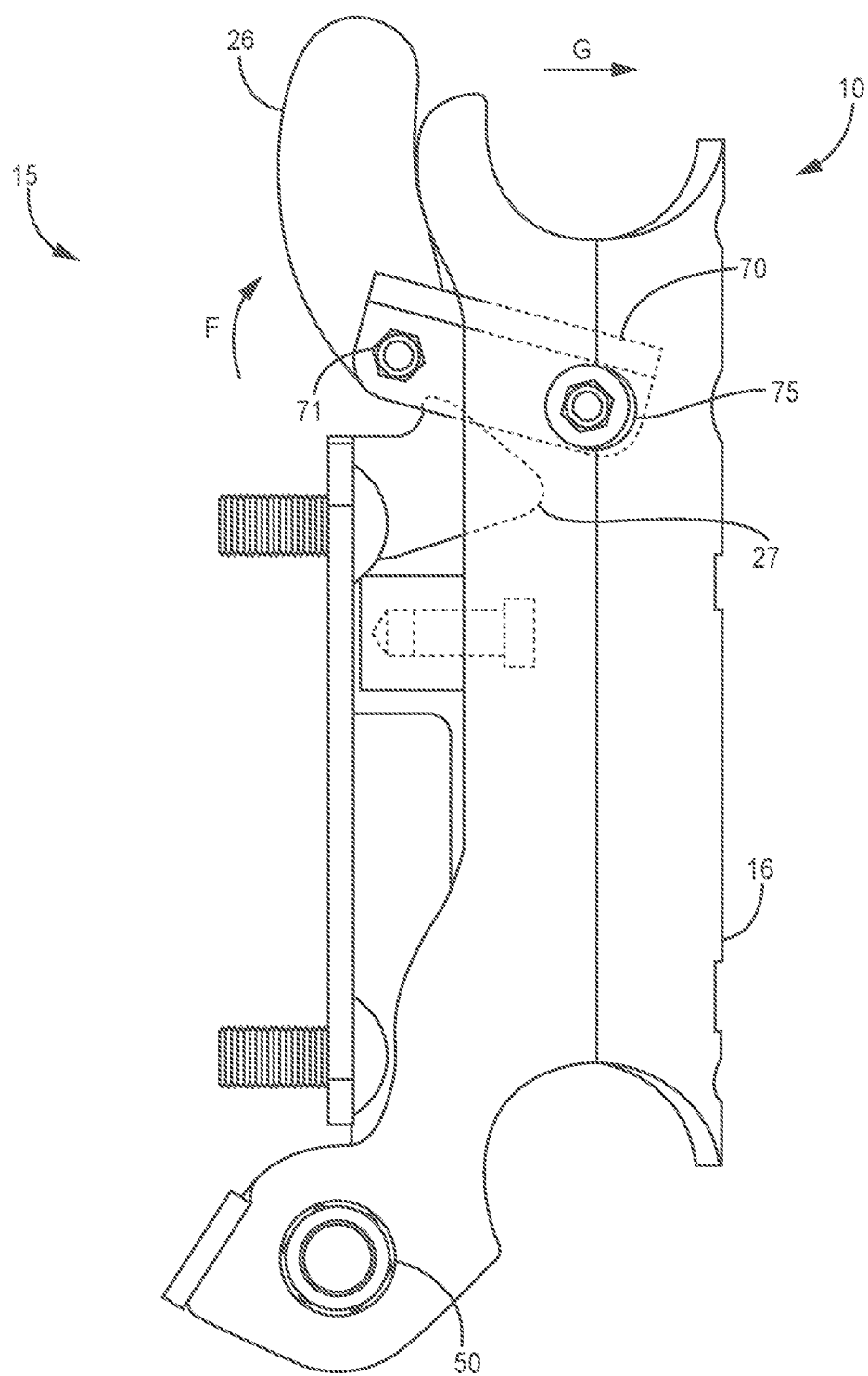
FIG. 28B is a cross-sectional view of an exemplary embodiment of the quick release grill guard wherein the quick release bar is in the open position.
Figure 29:
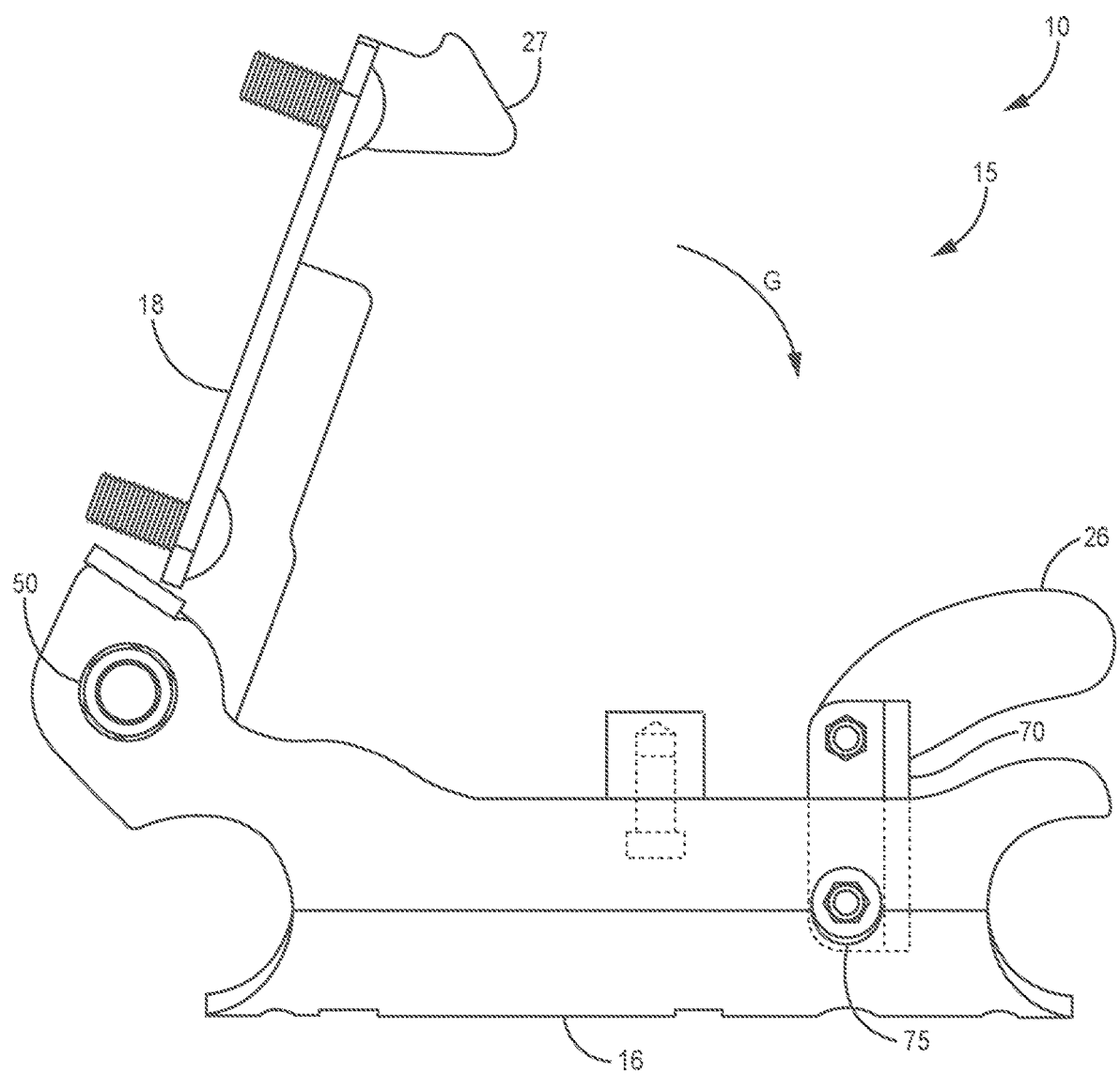
FIG. 29 is a cross-sectional view of an exemplary embodiment of the quick release grill guard wherein the quick release bar is in the open position and the grill guard coupling portion has been pivoted away from the grill.
Figure 30:
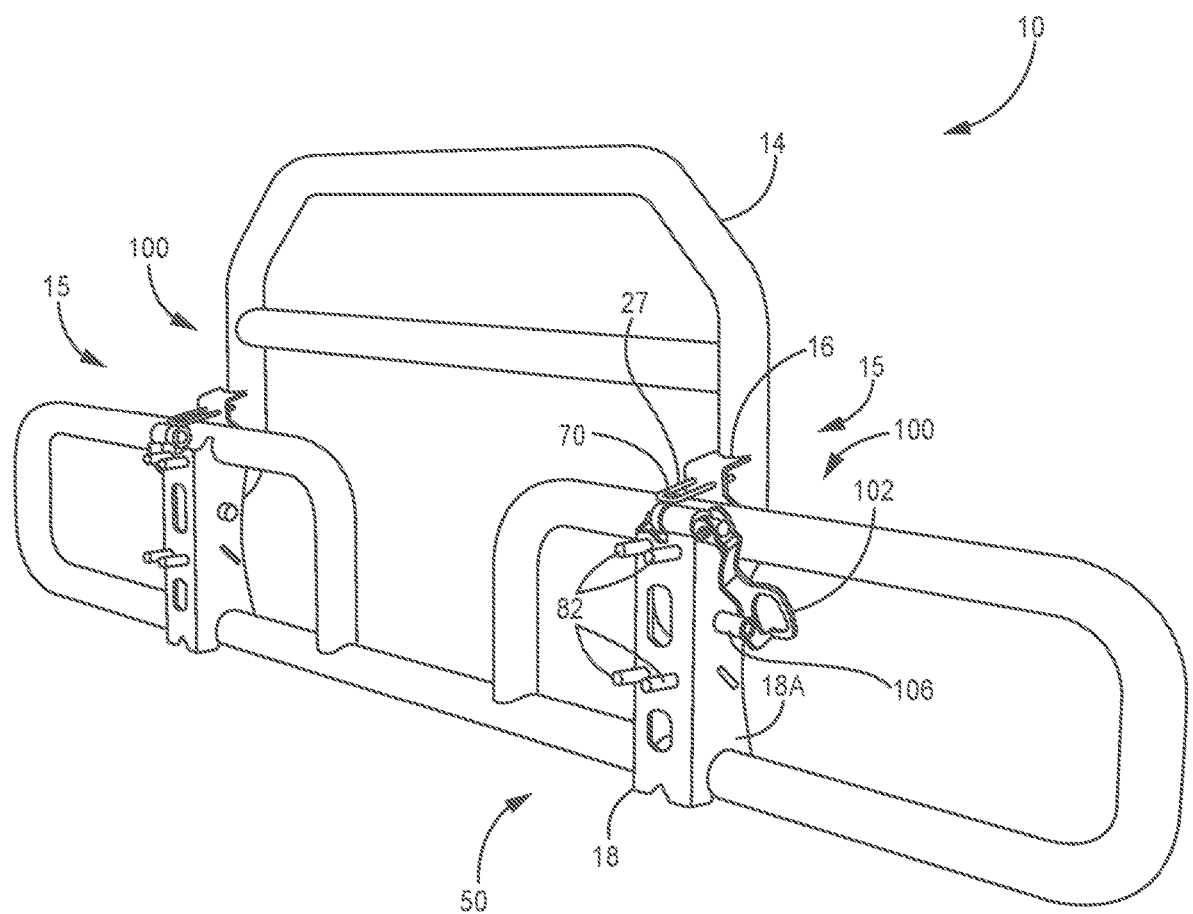
FIG. 30 is a three-quarters view of an exemplary embodiment of the quick release grill guard having a dual cam latch.
Figure 31:
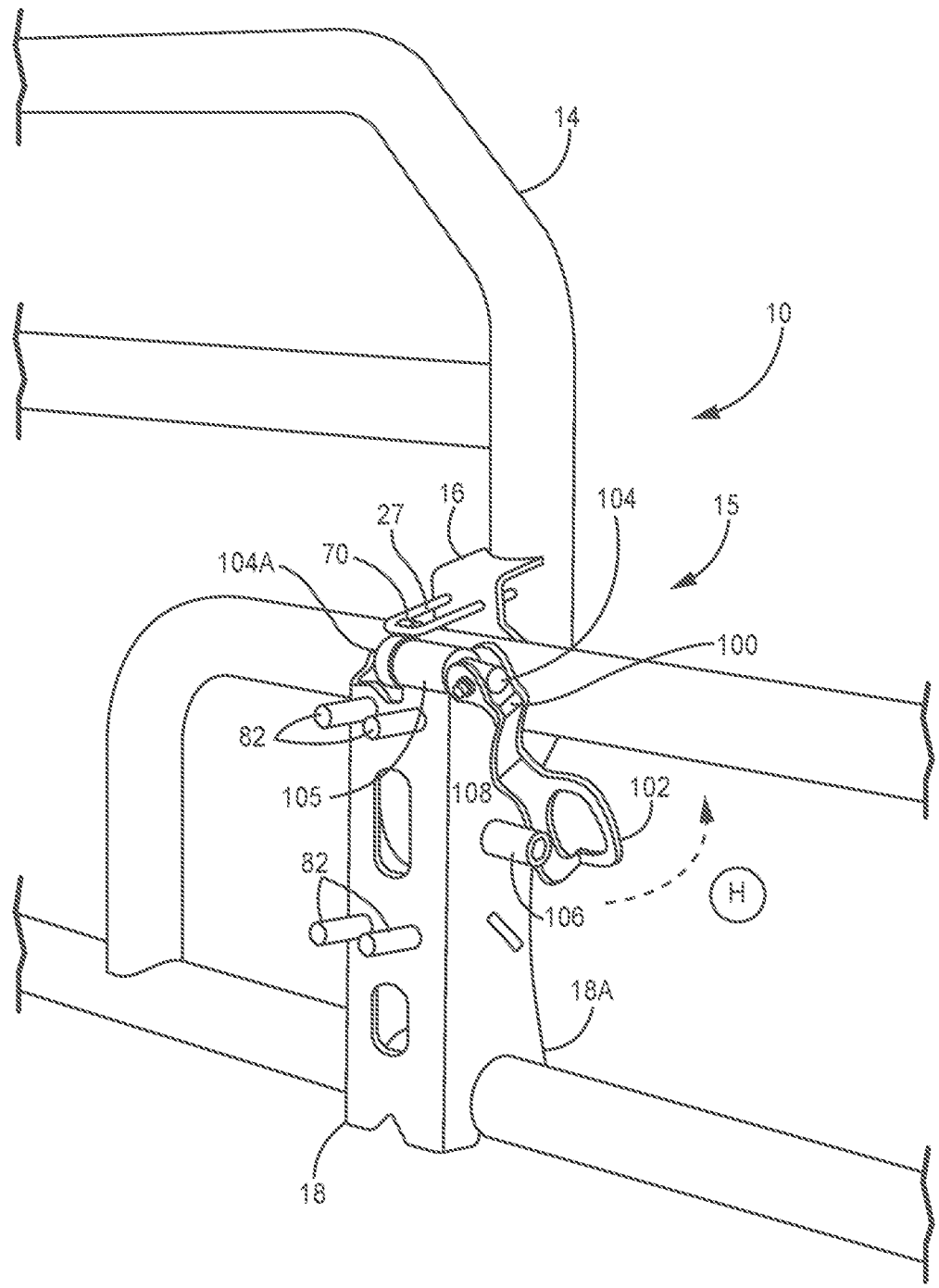
FIG. 31 is a close-up view of the implementation of FIG. 30.
Figure 32:
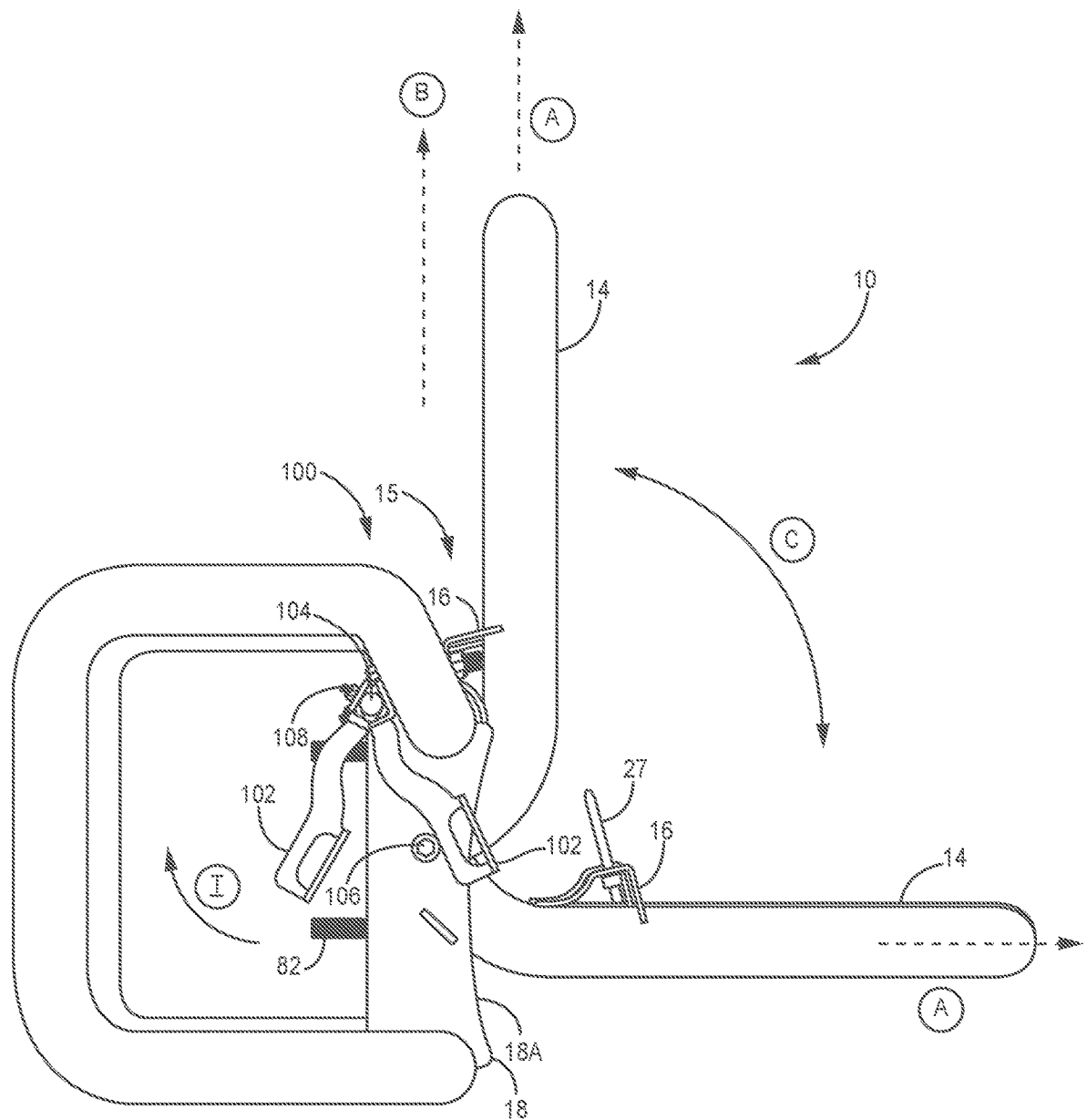
FIG. 32 is a side view of an exemplary embodiment of the quick release grill guard having a dual cam latch.
Figure 33:
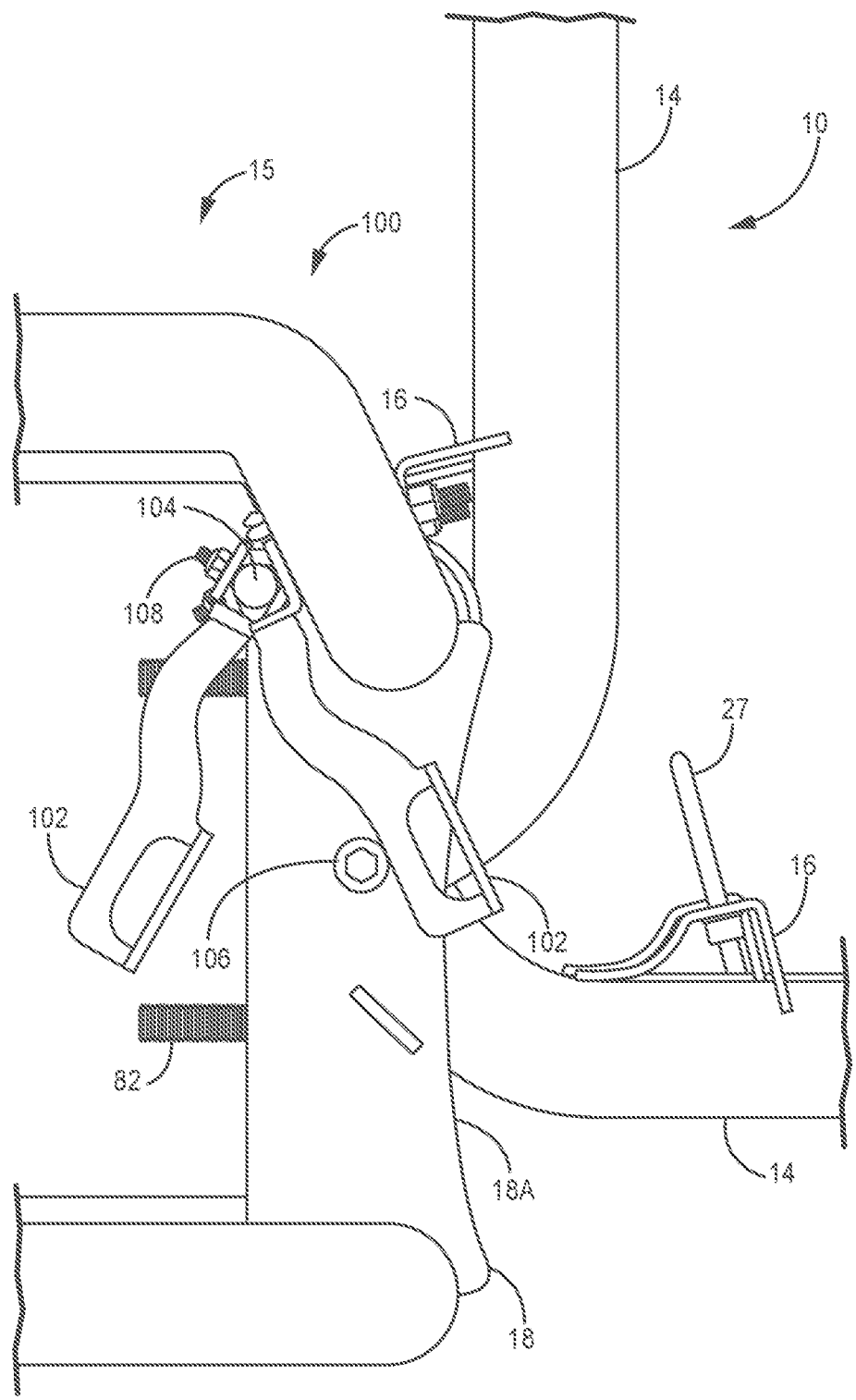
FIG. 33 is a close-up view of the implementation of FIG. 32.

FIGS. 25-29 shown an additional exemplary implementation of a grill guard 10 with a single operation handle or quick release bar 26. FIG. 25 shows a perspective view of an exemplary implementation of a grill guard; FIG. 26 shows a perspective view of an exemplary implementation of a latching system 15; FIG. 27 shows a top perspective view of a latching system 15 according to the implementation of FIG. 26; FIG. 28A shows a side view of an exemplary latching system 15 in a closed configured; FIG. 28B shows a side view of a latching system 15 according to the implementation of FIG. 28A with the release bar 26 in an actuated position; FIG. 19 is a side view of the latching system of FIG. 28A in an open configuration.

In various implementations, the grill guard comprises at least two latching systems 15, an elongate release bar 26, a vehicle coupling portion 18, and a grill guard coupling portion 16.

In these and other implementation the vehicle coupling portion 18 comprises a substantially planar member having a plurality of fasteners 90 extending therefrom and/or therethrough. The fasteners 90 are constructed and arranged to couple a corresponding aperture 6 on the vehicle 1 as would be known to those of skill in the art. In various implementations, the fasteners 90, are threaded bolts and/or screw, or other fastener as would be appreciated by those of skill in the art. In some implementations, the vehicle coupling portion 18 has at least four fasteners 90. Further, the vehicle coupling portion 18 may comprise a clasped member as described above.

In various implementations, shown in FIGS. 25-29, the latching system 15 may have a stop 92. In these and other implementations, the stop 92 is disposed on the grill guard coupling portion 16. The stop 92 is constructed such that the stop 90 abuts the vehicle coupling member 18 when the latching system 15 is in the engaged/closed position and reduces wear and tear on the components. In various implementations, the stop 92 is configured such that the grill guard coupling portion 16 cannot extend past its optimal plane when in the engaged position, further ensuring a secure connection of the latching mechanism 15. It will be readily appreciated that the inclusion of the stop 92 according to these implementations can prevent loosening of the latching systems 15 over extended use time.

As shown in FIGS. 30-33, in various implementations the latching system 15 comprises a dual cam latch 100 constructed and arranged to release the grill guard coupling portion 16 from the vehicle coupling portion 18, as described above. In these implementations, a pivoting handle 102 is provided on either side that is in rotational communication with a pivot axle 104 disposed on the vehicle coupling portion 18 and secured in an axle housing 15 via a stop disc 104A that is sized to secure the axle 104 within the axle housing 15 in a freely rotatable state but without permitting lateral movement, as would be readily understood. It is also readily appreciated that in these implementations, axle 104 lateral movement is also restrained via the dual cam pin 108 on the opposite side.

In these implementations, the clasping member 70 is disposed on the axle 104 so as to be in rotational communication with the handle 102, and the clasped member 27 is affixed to the grill coupling portion 16 and is configured to be release by the rotation of the clasping member 27, as would be readily appreciated by those of skill in the art.

In various implementations, a stop pin 106 is affixed to the vehicle coupling portion 18 housing 18A that is constructed and arranged to secure the pivoting handle 102 adjacent to the side of the housing 18A when the dual cam latch 100 is in the locked state.

In use, and as shown by reference arrow H, the dual cam pin 108 is configured to allow the handle 102 first be urged laterally so as to release the abutment with the stop pin 106 and enter an unlocked state. The user is then able to rotate the handle 102 (shown at reference arrow I) and in turn the clasping member 27 so as to disengage the clasping member 27 from the clasped member 70 and permit the free rotation of the grill 14 about the hinge 50 as described above.

It is readily appreciated that in these implementations, the fastener system 80 can be integrated into the housing 18A so as to extend the threaded bolt 82 and/or elongate member 88 into the vehicle via the aperture 6.

Although the disclosure has been described with reference to preferred embodiments, persons skilled in the art will recognize that changes may be made in form and detail without departing from the spirit and scope of the disclosed apparatus, systems and methods.

What is claimed is:

1. A vehicle guard latching system comprising:
   (a) a quick release bar connecting a first clasping member and a second clasping member;
   (b) a first latch configured to be disposed on a first portion of a guard, the first latch comprising:
      (i) a first vehicle coupling bracket; and
      (ii) a first clasped member disposed on the first vehicle coupling bracket,
      wherein the first clasped member is configured for releasable engagement with the first clasping member;
   (c) a second latch configured to be disposed on a second portion of the guard, the second latch comprising:
      (ii) a second vehicle coupling bracket; and
      (iii) a second clasped member disposed on the second vehicle coupling bracket,
      wherein the second clasped member is configured for releasable engagement with the second clasping member; and
   wherein actuation of the release bar causes the first clasping member and the second clasping member to disengage from the first clasped member and the second clasped member.

2. The vehicle guard latching system of claim 1, wherein the quick release bar pivots about a first hinge and a second hinge.

3. The vehicle guard latching system of claim 1, wherein the first clasping member comprises a first latching pin and wherein the second clasping member comprises a second latching pin.

4. The vehicle guard latching system of claim 1, further comprising at least one stop disposed on the first vehicle coupling bracket.

5. The vehicle guard latching system of claim 1, further comprising at least one spring operatively engaged with the first latch, the at least one spring configured to hold the first clasping member and the first clasped member in contact when engaged.

6. The vehicle guard latching system of claim 1, wherein the first vehicle coupling bracket and the second vehicle coupling bracket are configured to fit within apertures of a vehicle.

7. The vehicle guard latching system of claim 1, wherein the first vehicle coupling bracket and the second vehicle coupling bracket are shaped and arranged for attachment to towing points of the vehicle.

8. The vehicle guard latching system of claim 1, wherein the first vehicle coupling bracket comprises an elongate member comprising a threaded portion at a distal end of the elongate member.

9. The vehicle guard latching system of claim 1, further comprising:
  (a) a first towing mount defining a first opening coupled to the first vehicle coupling bracket and
  (b) a second towing mount defining a second opening coupled to the second vehicle coupling bracket.

10. A pivoting grill guard latching system comprising:
  (a) a first latch configured to be engaged with a first upright of a grill guard, the first latching system comprising:
    (i) a first clasping member comprising a first latching pin;
    (ii) a first clasped member;
    (iii) a first vehicle coupling portion configured to attach the first latch to a vehicle, and
    (iv) a first hinge configured for rotatable movement of the first clasping member relative to the vehicle,
    wherein the first latching pin is configured to be fitted within the first clasped member when the first latch is in a locked position;
  (b) a second latch configured to be engaged with a second upright of the grill guard, the second latching system comprising:
    (i) a second clasping member comprising a second latching pin;
    (ii) a second clasped member;
    (iii) a second vehicle coupling portion configured attached the second latch to the vehicle; and
    (iv) a second hinge configured for rotatable movement of the second clasping member relative to the vehicle,
    wherein the second latching pin is configured to be fitted within the second clasped member when the second latching system is in the locked position; and
  (d) a quick release bar extending from the first clasping member to the second clasping member for simultaneous operation of the first latching system and the second latching system.

11. The pivoting grill guard latching system of claim 10, wherein actuation of the quick release bar causes the first latching pin to become unseated from the first clasped member and simultaneously the second latching pin to become unseated from the second clasped member.

12. The pivoting grill guard latching system of claim 10, wherein the first vehicle coupling portion and the second vehicle coupling portion are configured to fit within apertures of the vehicle.

13. The pivoting grill guard latching system of claim 10, wherein the first vehicle coupling portion and the second vehicle coupling portion are shaped and arranged for attached to towing point of the vehicle.

14. The pivoting grill guard latching system of claim 10, wherein the first vehicle coupling portion comprises an elongate member comprising a threaded portion at a distal end of the elongate member.

15. The pivoting grill guard latching system of claim 10, wherein the first latch comprises at least one stop disposed on the first vehicle coupling portion.

16. The pivoting grill guard latching system of claim 10, wherein the first latch comprises at least one spring configured to hold the first clasping member and the first clasped member in contact when the first latching system is in the locked position.

17. The pivoting grill guard latching system of claim 16, wherein the second latch comprises at least one spring configured to hold the second clasping member and the second clasped member in contact when the second latching system is in the locked position.

18. The pivoting grill guard of claim 8, further comprising:
  (a) a first towing mount defining a first opening coupled to the first vehicle coupling portion and
  (b) a second towing mount defining a second opening coupled to the second vehicle coupling portion.

19. A latching system comprising:
  (a) a first latch configured to be engaged with a guard, the first latch comprising:
    (i) a first clasping member;
    (ii) a first clasped member;
    (iii) a first vehicle coupling portion comprising a first elongate member shaped to extend through a first aperture in a vehicle and configured to attach the first latch to the vehicle;
    (iv) a first hinge configured for rotatable movement of the guard relative to the vehicle; and
    (v) a first towing mount defining a first opening coupled to a proximal end of the first vehicle coupling portion; and
  (b) a second latch engaged with the guard, the second latch comprising:
    (i) a second clasping member comprising a second latching pin;
    (ii) a second clasped member;
    (iii) a second vehicle coupling portion comprising a second elongate member shaped to extend through a second aperture in the vehicle and configured attached the second latch to the vehicle;
    (iv) a second hinge configured for rotatable movement of the guard relative to the vehicle; and
    (v) a second towing mount defining a second opening coupled to a proximal end of the second vehicle coupling portion.

20. The grill guard of claim 16, wherein the first elongate member and the second elongate member are configured to be attached to vehicle tow point receivers.

* * * * *

UNITED STATES PATENT AND TRADEMARK OFFICE
CERTIFICATE OF CORRECTION

PATENT NO. : 11,691,582 B2  
APPLICATION NO. : 17/576099  
DATED : July 4, 2023  
INVENTOR(S) : Jeremy Drever Page 1 of 1

It is certified that error appears in the above-identified patent and that said Letters Patent is hereby corrected as shown below:

On the Title Page

Item (60) should read:
U.S. Patent Application 16/877,168 claims benefit of Provisional Application Number 62/849,240

Signed and Sealed this  
Second Day of September, 2025

Coke Morgan Stewart  
*Acting Director of the United States Patent and Trademark Office*